US011418260B2

(12) United States Patent
Alic et al.

(10) Patent No.: US 11,418,260 B2
(45) Date of Patent: Aug. 16, 2022

(54) NONLINEARITY CANCELLATION IN FIBER OPTIC TRANSMISSION BASED ON FREQUENCY-MUTUALLY-REFERENCED CARRIERS

(71) Applicant: THE REGENTS OF THE UNIVERSITY OF CALIFORNIA, Oakland, CA (US)

(72) Inventors: Nikola Alic, La Jolla, CA (US); Stojan Radic, San Diego, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 17/089,698

(22) Filed: Nov. 4, 2020

(65) Prior Publication Data

US 2021/0050919 A1 Feb. 18, 2021

Related U.S. Application Data

(63) Continuation of application No. 15/121,346, filed as application No. PCT/US2015/017399 on Feb. 24, 2015, now abandoned.

(Continued)

(51) Int. Cl.
*H04B 10/2543* (2013.01)
*H04B 10/50* (2013.01)
(Continued)

(52) U.S. Cl.
CPC ....... *H04B 10/2543* (2013.01); *H04B 10/506* (2013.01); *H04B 10/572* (2013.01);
(Continued)

(58) Field of Classification Search
None
See application file for complete search history.

(56) References Cited

U.S. PATENT DOCUMENTS

| 6,088,088 | A | 7/2000 | Fortenberry | |
|---|---|---|---|---|
| 6,259,543 | B1 * | 7/2001 | Golovchenko | .... H04B 10/0795 398/110 |

(Continued)

FOREIGN PATENT DOCUMENTS

| JP | 4827944 | * | 9/2011 | ............. H04B 10/02 |
|---|---|---|---|---|
| JP | 4813963 | * | 11/2011 | ............. H04B 10/02 |

(Continued)

OTHER PUBLICATIONS

Alic, N., et al., "Nonlinearity Cancellation in Fiber Optic Links Based on Frequency Referenced Carriers", J. Lightwave Tech., vol. 32, No. 15, Aug. 1, 2014, 2690-2698.

(Continued)

*Primary Examiner* — Li Liu
(74) *Attorney, Agent, or Firm* — Eleanor Musick; Torrey Pines Law Group, PC

(57) ABSTRACT

A system and method for mitigating nonlinearity in an optical communication link with multiple carriers uses mutual frequency referencing to stabilize at least a portion of the multiple carriers. Using at least one frequency-referenced signal, carrier nonlinearity can be determined and compensated within the link by pre-distortion, back-propagation, or a combination of both. Mutual frequency referencing may be performed at the emitting end of the link, at the receiving end, or a combination of both.

17 Claims, 11 Drawing Sheets

Related U.S. Application Data

(60) Provisional application No. 61/943,753, filed on Feb. 24, 2014.

(51) Int. Cl.
  *H04B 10/572* (2013.01)
  *H04B 10/61* (2013.01)
  *H04J 14/02* (2006.01)
  *H04B 10/69* (2013.01)
  *H04J 14/06* (2006.01)
  *H04L 25/03* (2006.01)

(52) U.S. Cl.
  CPC ....... *H04B 10/6163* (2013.01); *H04B 10/697* (2013.01); *H04J 14/02* (2013.01); *H04J 14/06* (2013.01); *H04L 25/03006* (2013.01); *H04B 2210/252* (2013.01); *H04B 2210/254* (2013.01)

(56) References Cited

U.S. PATENT DOCUMENTS

| | | | |
|---|---|---|---|
| 6,912,359 B2 | 6/2005 | Blumenthal et al. | |
| 7,315,697 B2* | 1/2008 | Smilanski | H04B 10/2543 398/183 |
| 8,447,155 B1* | 5/2013 | Kuo | G02F 1/383 385/122 |
| 8,451,528 B1* | 5/2013 | Kuo | G02F 1/353 359/264 |
| 2002/0191256 A1 | 12/2002 | Schemmann et al. | |
| 2003/0091097 A1 | 5/2003 | Yap et al. | |
| 2006/0263096 A1* | 11/2006 | Dinu | H04L 9/0858 398/187 |
| 2008/0285606 A1 | 11/2008 | Kippenberg et al. | |
| 2009/0214215 A1* | 8/2009 | Li | H04J 14/02 398/81 |
| 2010/0034542 A1 | 2/2010 | Armstrong | |
| 2010/0239262 A1* | 9/2010 | Li | H04B 10/2507 398/81 |
| 2011/0069975 A1* | 3/2011 | Liu | H04B 10/61 398/202 |
| 2011/0285980 A1 | 11/2011 | Newbury et al. | |
| 2012/0219303 A1* | 8/2012 | Li | H04B 10/2543 398/208 |
| 2012/0230694 A1* | 9/2012 | Tanaka | H04J 14/0298 398/79 |
| 2012/0263481 A1* | 10/2012 | Ip | H04B 10/6971 398/193 |
| 2012/0290244 A1* | 11/2012 | Yan | H04B 10/255 702/86 |
| 2013/0216228 A1 | 8/2013 | Nazarathy et al. | |
| 2014/0050476 A1* | 2/2014 | Grigoryan | H04J 14/06 398/65 |
| 2014/0070072 A1* | 3/2014 | Kuo | G01J 1/16 250/205 |
| 2014/0199076 A1* | 7/2014 | Yu | H04B 10/2543 398/81 |
| 2014/0254619 A1 | 9/2014 | Ataie et al. | |
| 2015/0159990 A1* | 6/2015 | Plusquellic | H01S 3/0057 356/451 |

FOREIGN PATENT DOCUMENTS

| | | | |
|---|---|---|---|
| JP | 4813963 B2 | 11/2011 | |
| JP | 4827944 B2 | 11/2011 | |
| JP | 5147582 | * 12/2012 | ......... H04B 10/2543 |
| JP | 5147582 B2 | 2/2013 | |
| WO | 2015127478 A1 | 8/2015 | |

OTHER PUBLICATIONS

Ataie, v., et al., "Ultrafast Absolute Ranging by Coherent Parametric Comb," in Optical Fiber Communication Conference, OSA Technical Digest (online) (Optical Society of America, 2013), paper OTh3D.2.

Bernhardt, B., "Cavity-enhanced dual-comb spectroscopy", Nature Photonics, Nov. 29, 2009 (published on-line), 4, 55-57.

Chi, H. et al., "Fiber chromatic dispersion measurement based on wavelength-to-time mapping using a femtosecond pulse laser and an optical comb filter", Optics Communications, 280 (2007) 337-342.

Coddington, I., et al., "Coherent Multiheterodyne Spectroscopy Using Stabilized Optical Frequency Combs", Physical Review Letters, Jan. 11, 2008, vol. 100, 13902-1-13902-4.

Gohle, C., et al., Frequency Comb Vernier Spectroscopy for Broadband, High-Resolution, High-Sensitivity Absorption and Dispersion Spectra, Physical Rev. Letters, Dec. 31, 2007, vol. 99, 263902-1-263901-4.

International Search Report and Written Opinion for PCT/US2015/017399 dated May 19, 2015, 8 pages.

Kuo, B. P. P. , et al. "Simultaneous wavelength-swept generation in NIR and SWIR bands over combined 329-nm band using swept-pump fiber optical parametric oscillator," J. Lightwave Technol. 29, pp. 410-416 (2011).

Kuo, B. P. P. , et al. "Transmission of 640-GB/s RZ-OOK Channel over 100-km SSMF by wavelength-transparent conjugation," J. Lightwave Technol. 29, pp. 516-523 (2011).

Kuo, B.P.-P. et al., "Highly nonlinear fiber with dispersive characteristic invariant to fabrication fluctuations", Opt Express. Mar. 26, 2012;20(7); pp. 7716-7725.

Kuo, B.P.-P., et al, "Wideband Parametric Frequency Comb as Coherent Optical Carrier", J. Lightwave Tech., 31(21), Nov. 1, 2013, pp. 3414-3419.

Kuo, B.P.-P., et al., "Continuous-wave, short-wavelength infrared mixer using dispersion-stabilized highly-nonlinear fiber", Optics Express, 20(16), Jul. 30, 2012, 18422-18431.

Myslivets, E. et al., "Spatially Resolved Measurements of Chromatic Dispersion in Fibers", J. Lightwave Technology, 33(3) Feb. 1, 2015, 597-608.

Pejkic, A., et al., "All-optical switching in a highly efficient parametric fiber mixer: design study", Optics Express, Sep. 22, 2014, vol. 22, No. 19, 23512-23527.

Radic, S., "Parametric Signal Processing, IEEE Journal of Selected Topics in Quantum Electronics", vol. 18, No. 2, Mar./Apr. 2012, pp. 670-680.

Temprana, E., et al., "Low-noise parametric frequency comb for continuous C-plus-L-band 16-QAM channels generation," Opt. Express 22, 6822-6828 (2014).

Tong, Z. et al., "Spectral linewidth preservation in parametric frequency combs seeded by dual pumps", Optics Express, 20(16) Jul. 30, 2012, 17610-17619.

Wiberg, A.O.J., et al., "Coherent Filterless Wideband Microwave/Millimeter-Wave Channelizer Based on Broadband Parametric Mixers", J. Lightwave Tech., 32(20), Oct. 15, 2014, 3609-3617.

Inuzuka, F. , et al., "Performance of nonlinear interchannel crosstalk pre-compensation at zero-dispersion wavelength using carrier phase-locked WDM", Electronics Letters, 43(13) Jun. 21, 2007, pp. 729-730.

Yamazaki, E., et al., "Nonlinear Inter-Channel Crosstalk Compensation in Carrier Phase Locked WDM", Proc. of European Conference on Optical Communications (ECOC 2006), Oct. 28, 2006, DOI: 10.1109/ECOC.2006.4800992.

Yamazaki, E., et al., "Compensation of Interchannel Crosstalk Induced by Optical Fiber Nonlinearity in Carrier Phase-Locked WDM System", IEEE Photonics Tech. Letters, 19(1) Jan. 1, 2007, pp. 9-11.

* cited by examiner

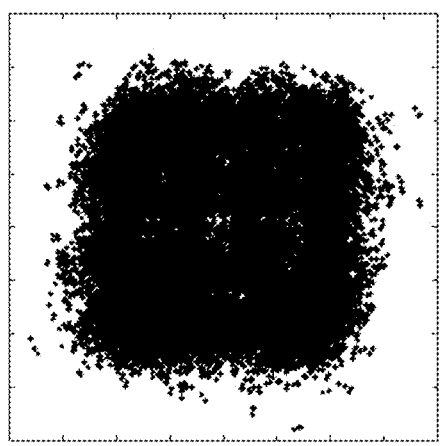 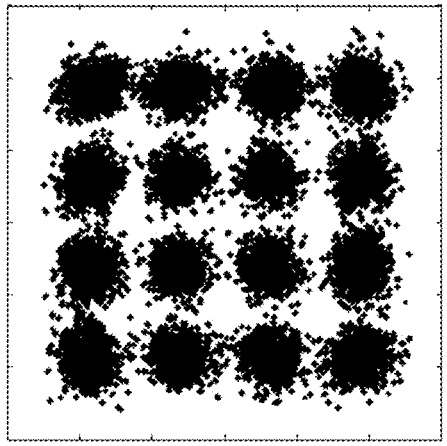
FIG. 9A   FIG. 9B
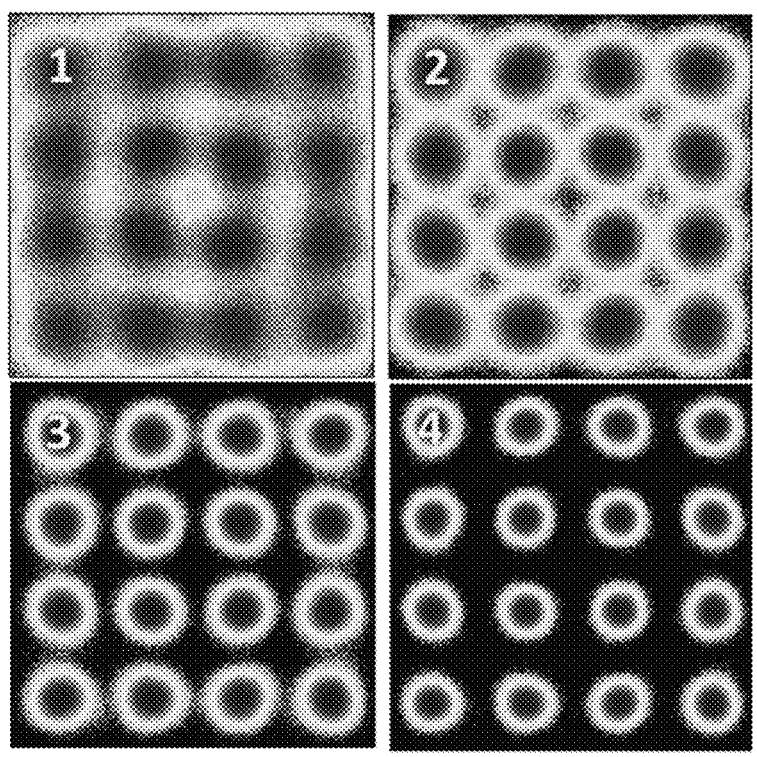
FIG. 10

NONLINEARITY CANCELLATION IN FIBER OPTIC TRANSMISSION BASED ON FREQUENCY-MUTUALLY-REFERENCED CARRIERS

RELATED APPLICATIONS

This is a continuation of application Ser. No. 15/121,346, filed Aug. 24, 2016, which is a 371 national stage filing of International Application No. PCT/US2015/017399, filed Feb. 24, 2015, which claims the benefit of the priority of U.S. Provisional Application No. 61/943,753, filed Feb. 24, 2014, each of which is incorporated herein by reference in its entirety.

BACKGROUND OF THE INVENTION

Field of the Invention

The present invention relates generally to the field of optical communications and optical communication links, and more particularly to the mitigation of the nonlinear impairments in optical fiber-based communication links.

Background

Propagation through optical fiber is beset with several limitations, especially as distance is increased to multi-span amplified systems. As transmission systems have expanded to cover longer distances and transmit at higher bit rates, the linear effect of fibers—attenuation and dispersion—become a limiting factor. In the case of WDM systems, nonlinear effects can become important even at moderate powers and bit rates. Nonlinear impairments are a critical concern in optical networks since long-haul transmission commonly relies on high power lasers to transmit optical pulses over long spans to overcome attenuation. Nonlinear impairments depend mainly on the fiber type and length. Currently, all commercial systems rely on the so-called single mode fibers that support a single electro-magnetic mode in each of the two orthogonal polarizations of light. In an effort to increase the capacity transmitted over a single fiber waveguide, recent work has been directed to multi-mode and/or multi-core fibers. The core of multi-mode fibers is larger than that of single mode fibers and can, thus, support more than one electromagnetic mode. Thus, at least in theory, multi-mode fibers should be able to transmit some multiple of the amount of information transmitted via single mode fiber. On the other hand, multi-core waveguides contain more than one core, each of which can be either single, or multi-mode, thus facilitating transmission of more information, in a way similar to multiple parallel fiber waveguides, albeit encompassed by the same cladding.

Currently, there are a number of solutions for mitigation of nonlinear impairments in fiber optic communication links. Some solutions attempt to transmit the information at a reduced power level so as not to provoke the nonlinear response. These solutions fail to meet the needs of the industry because the effect of noise on the transmitted signal becomes more pronounced, ultimately limiting the attainable reach of the system by the mere achievable signal-to-noise ratio (SNR), which in a fiber optic links system declines uniformly with propagation, as well after each amplifier in the link. Other solutions attempt to take advantage of the link dispersion engineering by alternating the types of optical fiber (or more precisely, the levels of dispersion) to reduce the impact of the nonlinear impairments. Such solutions are similarly unable to meet the needs of the industry because fiber types other than the standard single mode fiber exhibit elevated levels of loss, ultimately leading to SNR limitations similar to the systems described above. Still other solutions seek to mitigate the nonlinear impairment by relying on fibers with a larger effective area, and thus lowered nonlinearity. These solutions also fail to meet industry needs because they are unable to provide the level of performance or reach required, in addition to elevating the total system cost. Another class of methods attempts to mitigate the nonlinear impairments by electronic equalization by either pre-compensating the transmitted waveforms, or post-equalizing the received signal by (an often lower complexity fiber propagation model—possibly relying on look-up tables). Unfortunately, even these systems have not been able to attain the industry-required performance due to their modest ability to compensate the nonlinear effects in transmission to the desired level, and/or provide a significant reach extension.

The need remains for a fiber link that allows higher launch power signals per span in fiber optic communication systems to achieve a longer reach and improved performance. Preferably, such a fiber link would allow elevated spectral utilization or spectral efficiency, as measured in units of bits per second per Hertz (bit/sec-Hz), which can be used to significantly increase the attainable transmission reach without compromising signal quality. Still further, it would be desirable to have a fiber link that provides the desired performance irrespective of the type of fiber (or a combination thereof) used in the link design.

SUMMARY OF THE INVENTION

In an exemplary embodiment, the present invention addresses the deficiencies of the prior art by providing nonlinearity cancellation based on frequency-locked, or frequency- and/or phase-mutually-referenced, oscillators. This approach allows a substantial increase in the launched power per span, thus extending system reach and improving performance as compared to existing systems.

The inventive approach utilizes one or more of a set of mutually frequency-locked, mutually frequency referenced, and/or fully phase-locked carriers. This differs from approaches used in existing optical communication systems, in which data are imprinted onto the carriers with stochastically-varying frequencies and phases (often referred to as "free running") information carriers (i.e., lasers). In effect, the frequency-locked multi-wavelength source is used to provide a set, or a subset, of frequency carriers in an optical transmission system. The carriers are fanned out (or demultiplexed) to the respective transmitters in a single polarization, or polarization-multiplexed system, where the information bearing waveforms are imprinted onto the respective carriers. The actual mitigation of the nonlinear impairments can be performed at the transmitting end, the receiving end, or partially at both ends of the communication system. The technique used can include existing pre-compensation or back propagation techniques, or can utilize some other equalization method aimed at nonlinearity mitigation in fiber optic links, performed jointly on all channels or a subset of the transmitted channels. The modulated channels are then multiplexed and launched into the transmission link. At the receiver side, and upon transmission, the wavelength division multiplex (WDM) channels are demultiplexed. Receivers defined by the underlying transmitted modulation format(s) may be used to receive the information. Such receivers may include, but are not limited to, any digital signal processing techniques for, e.g., carrier recovery and/or frequency offset determination in the demodulation process, dispersion and polarization mode dispersion mitigation, and error control coding and/or protocol-related headers and framing, prior to the information recovery.

In one embodiment, the inventive approach exploits the feature that the time domain phase conjugation has the ability to reverse the nonlinear impairments in propagation that tend to severely degrade the performance of high speed fiber optic transmission systems.

In an exemplary embodiment, the inventive method includes three components:

(i) pre-compensation (pre-distortion) of the information-bearing waveforms. This contrasts with the conventional back-propagation approach—rather than compensating at the receiving end, the signal waveforms are appropriately conditioned, i.e., shaped, at the transmitter in WDM;

(ii) the particular pre-distortion pattern is obtained by computing the output of the transmission system with all the data and taking some form of the inverse operation of the involved signals' propagation (often denoted as back-propagation). The total pre-compensating field waveform is realized by modulation of the carriers of the WDM system, which is subsequently transmitted through the link. It is assumed that the transmitted data, including any protocol and error control coding information, is divided into frames; and (iii) frequency (and possibly, but not necessarily phase) locking of the carriers in the WDM systems, without which an accurate nonlinear compensation is not possible.

In one embodiment, the set of frequency-locked carriers can originate from an optical frequency comb, or multiple similar constructs, covering the transmission spectral range of the system. In another embodiment, the carriers used for transmission may be externally frequency-locked or stabilized with respect to a frequency reference, or multiple such references. In yet another implementation, such frequency reference can be a frequency comb used to stabilize, or lock the actual carriers of the optical communication system. Other variations of frequency locking methods are possible. For example, the frequencies of the information carriers need not be stable in the absolute sense—if there is frequency drift, it is essential that the drift between the carriers is mutually dependent and/or at least correlated. As examples, the aforementioned frequency referencing of free running lasers to one, or more master frequency reference (e.g., a frequency comb) can be accomplished by one, or a combination of the following techniques: injection locking, opto-electronic phase-locked loops (PLLs), frequency-locked loops (FLLs), or cavity-based wavelength lockers. In brief, injection locking refers to a method of using an optical signal as a reference and injecting it into the cavity of a laser oscillator, thus forcing it to oscillate at the desired reference frequency. The wavelength lockers rely on extraneous cavities as the reference, whereas the departure of the laser light frequency to the latter (i.e., the reference cavities) is used as a feedback signal to form a correction signal, or an action (often by means of the laser injection current) in order to force the laser to emit at a desired frequency. The PLL and FLL approaches use a construct called an electronic phase-, or frequency-locked-loop in order to determine the departure of the laser emitting frequency to an optical frequency and to generate a corrective signal, or action fed back to the free-running laser, with the aim of forcing, or confining the laser emission to the desired frequency, or wavelength. Variations of these techniques, or alternative approaches to achieve the desired referencing will be apparent to one of skill in art.

In another embodiment, the techniques used in the present invention can be employed for equalization of the nonlinear response at the receiving end. In this approach, the information-bearing waveforms are still imprinted onto the mutually-frequency referenced, or frequency-locked, carriers without restriction with respect to the nonlinear interaction at the transmitter and/or any particular care in the mutual channel synchronicity in modulation. However, the nonlinear impairment mitigation can be performed at the receiver based on the received waveforms, for example, by joint back propagation of the received waveforms for multiple channels. Other approaches may be used and will be apparent to those in the art.

In one embodiment, equalization can be jointly performed at the receiving end on all, or a subset, e.g., blocks, of the received channels. Alternatively, a combination of pre-compensation and a receiver-end equalization may be used to achieve the same goal. In this case, the compensation of the nonlinear impairment is facilitated by utilizing an optical receiver with frequency referenced local oscillators, which may or may not be mutually fully phase locked, or referenced, whose output, after some digital signal processing, is passed to the back-propagation calculating block.

In another implementation, the inventive approach is applicable to calculation of waveforms for pre-equalization by phase conjugation. Here, the waveforms imprinted onto the carriers are in effect phase conjugate replica of the result of propagation through the virtual link characterized by opposite sign physical constants and negative gain to that of the actual physical link for which the equalization is being performed.

In yet another embodiment, the method is applicable to polarization multiplexed transmission systems, which transmit information in both orthogonal polarization of light at each optical carrier, or a subset of the optical carriers.

In still another embodiment, a portion, but not all, of the information carriers at the transmitting side, or a portion of the local oscillators at the receiving side, can be frequency locked. Instead, a full set of available carriers can be divided into mutually-locked subsets of locked carriers, which are either jointly referenced, or may not have correlated references. In another embodiment, the calculation of the waveform to be imprinted onto the carriers at the transmitter end can be based on a subset of transmitted to channels in which the transmission system channels are divided into groups, with the calculation and, thus, the equalization, performed separately for each group.

As a further possible embodiment, the waveforms to be imprinted onto the information carriers can be calculated based on a number of neighbors to the channel of interest, with the remainder of the channels considered as non-existent, or immaterial in that they are transmitting arbitrary/random information. In yet another embodiment, the calculation of the subset waveforms can be implemented either on the subsets separately, or, alternatively allowing overlap between the subsets of channels. In an additional embodiment, a strict phase relationship between the carriers can be maintained prior to launching into the link. Alternatively, maintenance of the mutual phase relationship between the carriers may not be necessary for a successful realization of the present invention. As an additional example, the method may be applied to so-called "super channel" transmission systems, with frequency referenced sources used as the super channel carriers in a single, or multiple super-channels.

As a further possible embodiment, the phase, or frequency drift of the carriers can fully or partially compensated as a part of the back-propagation mitigation (at the receiver end), possibly taking advantage of frequency and/or phase references, as well as any information from the digital signal processing algorithms on the course of signal demodulation. It should be noted that this approach involves locking of the local oscillators, which need to be jointly referenced in order to provide an absolute frequency reference. Such frequency-referencing or -locking can be achieved either directly by taking advantage of a frequency comb as a bank of local oscillators for the receivers of interest, or by locking free-running oscillators by one, or a combination of techniques—injection locking, wavelength lockers, PLL's, FLL's, as explained above.

In yet another embodiment absolute frequency and/or phase references can used at the receiver and as a part of back propagation impairments mitigation. The proper information from the frequency and/or phase references at the receiving end can avoid the explicit utilization of frequency-referenced sources at the transmitting side.

The inventive method is unique when compared with existing approaches in that it: (1) allows significant power increase per span while circumventing the normally associated performance penalty; (2) enables a longer transmission reach for an elevated spectral efficiency; and (3) produces superior performance in an optical communication link at a given reach.

The inventive approach produces greatly improved performance by exploiting at least the following important advances: (1) frequency-locked, or frequency mutually referenced carriers (either at the transmitting side, receiving side, or both) are employed to significantly improve the ability to mitigate nonlinear impairments; and (2) the physical implementation is compatible with an arbitrary nonlinear equalization method for nonlinearity mitigation.

Key among the improvements provided by the inventive approach is the significant mitigation of nonlinear effects in high speed fiber optic transmission without the penalties associated with prior solutions. It is still further an object of the present invention to increase the reach for telecom systems while also providing elevated spectral efficiency.

In one aspect of the invention, a method for mitigating nonlinearity in an optical communication link comprising multiple carriers, the method comprises applying mutual frequency referencing to at least a portion of the multiple carriers; using at least one frequency-referenced carrier, determining nonlinearity within the link; and compensating for the determined nonlinearity. In some embodiments, applying mutual frequency referencing is performed at an emitting end of the link. Applying mutual frequency referencing may include applying frequency locking. In some embodiments, frequency locking may include a method selected from injection locking, current injection, laser cavity control, opto-electronic phase-locked loops, frequency-locked loops and cavity-based wavelength lockers. Applying mutual frequency referencing may include generating the multiple carriers using a frequency comb or using stabilized independent lasers, referenced to one or common frequency references. The frequency reference may be located at an emitting end of the link or at a receiving end of the link. Compensating for determined nonlinearity may include applying a pre-distortion to the carriers to cancel the nonlinearity, or generating a virtual link characterized by opposite sign physical constants and negative gain relative to the link. Compensating for determined nonlinearity may alternatively include applying back propagation at the receiving end of the link to cancel the nonlinearity, while taking advantage of frequency referenced and possibly phase locked local oscillators among the receivers of interest. Additionally, the nonlinearity can be compensated in polarization multiplexed systems.

In another aspect of the invention, an optical fiber transmission system, includes a carrier source configured for generating a plurality of channels, wherein the channels are configured for imprinting with information-containing waveforms; a multiplexer configured for receiving the plurality of channels and outputting a multiplexed signal; one or more transmission links for transmitting the multiplexed signal, the transmission link comprising an optical fiber and an amplifier; a demultiplexer configured for receiving an optical signal at a receiving end of the transmission link; a plurality of receivers for receiving demultiplexed signals, each receiver configured for receiving one of the plurality of wavelengths; and a processor for detecting nonlinearity within the transmission link and calculating compensation for substantially cancelling the nonlinearity; wherein at least one of the carrier source and the plurality of receivers comprises a frequency-referenced local oscillator. In one embodiment, the carrier source is frequency-referenced and wherein the plurality of channels are at least partially mutually frequency locked. At least a portion of the plurality of channels may be subsets of neighboring channels, where the channels within each subset are mutually frequency locked. In some embodiments, the carrier source can be a frequency comb. The system may further include a pre-distortion processor configured for providing input to the carrier source. The pre-distortion processor may generate a virtual link characterized by opposite sign physical constants and negative gain relative to the transmission link. In other embodiments, the plurality of receivers may be frequency-locked local oscillators, and the processor may include a back-propagation block. The optical fiber may be selected from the group consisting of single mode fiber, multi-mode fiber, and multi-core fiber.

BRIEF DESCRIPTION OF THE DRAWINGS

The present invention will be better understood from the following detailed description of some embodiments of the invention, taken in conjunction with the accompanying drawings, in which like numbers correspond to like parts, and in which:

FIGS. 9A and 9B are constellation diagrams of received signals without and with nonlinearity cancellation according to the invention.

FIG. 10 is a set of constellation diagrams of received signals for four cases at 2 dBm per channel power for 16 Gbaud rate for uncompensated nonlinear impairment; nonlinearity cancellation with independent carriers; nonlinearity cancellation with 2 mutually coherent carriers and one independent carrier; nonlinearity cancellation with 3 mutually coherent carriers.

DETAILED DESCRIPTION OF EMBODIMENTS OF THE INVENTION

Figure 1A:
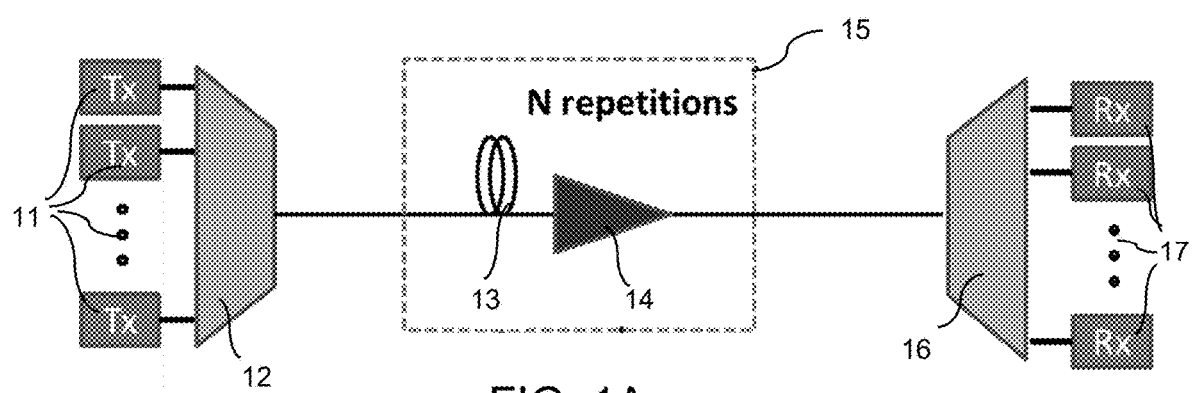
FIG. 1A is a block diagram of a conventional transmission system with carriers (lasers) independently wandering in frequency and phase.

The exemplary embodiments described herein involve the use of frequency-referenced optical oscillators for purposes of mitigating nonlinear effects arising during the propagation of an optical signal through optical waveguides and/or photonic systems. As will be apparent from the following detailed description of various exemplary embodiments, the inventive method may be accomplished using single- or multiple-frequency references, correlated or not. Further, the frequency referencing may be established either at the emitting end of the system, receiving end of the system, or using a combination of both. The inventive approach may be used in photonic systems allowing counter-directional propagation of signals within the same waveguide, containing either single, or multiple cores in a single cladding, and supporting guiding of either single-, or multiple electromagnetic modes, or a combination of both. The mitigation of nonlinear impairment can be achieved using frequency-referenced carriers that are already built into the system to perform other unrelated functions.

To provide a theoretical background, the field propagation in optical fibers is governed by the nonlinear Schrödinger equation, taking into account only the instantaneous electronic part of the nonlinear response:

$$\frac{\partial A}{\partial z} = i\gamma |A|^2 A - \frac{\alpha}{2} A - \frac{i}{2} \beta_2 \frac{\partial^2 A}{\partial t^2} + \frac{1}{6} \beta_3 \frac{\partial^3 A}{\partial t^3}, \quad (1)$$

where A represents the field complex envelope, $\beta_i$'s, the Taylor expansion coefficients of the mode propagation constant, capturing the dispersive waveguide properties, a, the fiber attenuation and $\gamma$ the fiber nonlinear coefficient. As inferred by the most commonly-employed numerical method for solving the propagation evolution (i.e., the split step method), the terms in Eq. (1) are often separated into the nonlinear operator/effects responsible for the nonlinear interactions (i.e., the first term on the right-hand side of Eq. (1)), as well as the linear operator, encompassing the remaining terms in Eq. (1).

We focus on the theoretical reversibility of nonlinear effects, and, thus, consider only a single polarization case of propagation, as implied by Eq. (1), in the absence of the stochastic effect of polarization mode dispersion. In principle, the nonlinear dynamics of Eq. (1) is well behaved and integrable, in that it yields a stable (although perhaps difficulty obtained in a closed form) solution for a given input condition and at power levels of interest in transmission systems. A corollary to the previous statement is that the nonlinear effects in propagation, at least those pertinent to the Kerr response of silica fibers, have been proven to be reversible. In sharp contrast, however, attempts to rid the transmission of the deleterious nonlinear impairment have been limited, in simulations and in practice alike. The inability to equalize the nonlinear impairment has led to the definition of the power-dependent bound to the capacity in optical communications.

The input condition to the propagation Eq. (1), consisting of the information streams on M wavelength division multiplexed (WDM) channels can be represented as follows:

$$A_{tot}(z=0; t) = e^{-i\omega_c t} \sum_{m=1}^{M} e^{-i[(\omega_m + \delta\omega_m(t))t + \delta\phi_m(t)]} \cdot \sum_{k} A_{mk} p(t-kT). \quad (2)$$

In Eq. (2), $\omega_c$ denotes the central frequency of the optical field, $\omega_m$ is the expected value of the carrier frequency offset of the channel m (in the set of M channels considered) relative to the central frequency, and p(t) is the generating pulse shape of the information waveforms (assumed to be shared by all the channels in the system.) Furthermore, it is assumed that the pulse shape is free of intersymbol interference throughout. The $A_{mk}$ (in Eq. 2) are the transmitted symbols realizations taken from a given alphabet set $\{A_m\}$. In particular, $\delta\omega$ and $\delta\phi$ in Eq. 2 represent stochastic variations of the information carriers' (angular) frequency and phase, respectively. The finite stochastic variations of the two quantities above have always been present in optical communication systems and stem from the system design based on discrete, and independent (often referred to as free-running) laser oscillators. Two aspects of the initial condition (2) are of particular importance. First, unlike for the linear operator (i.e., for the linear part of Eq. 1), it is easy to demonstrate that the Fourier basis is not the proper eigenbasis for the propagation equation (1). In the last statement, the notion of eigenfunction is assumed as that input function that can pass through a (dynamical) system unperturbed, except for a possible scaling by a (complex) factor. Unlike the classical NLS equation (i.e., Eq. (1) without loss and $\beta_3$ terms), having the eigenfunctions in the form of solutions, the presence of loss and higher order dispersion has made the pursuit of eigenfunctions of Eq. (1) futile to this point. More importantly, a simple substitution of a solution in the form A(z=0, t)=a·exp(−i $\omega_c$t) does not result in a common, separable exp(–i $\omega_c$t) term, typical of the eigenfunction factorization. As a consequence, perturbations in frequency of the input condition (2), and in particular with respect to the nonlinear operator, can excite much more considerable perturbation of the output (i.e., the solution), after propagation through a transmission link. In simple terms, even miniscule (e.g., 0.1%) variations of the frequency offsets of the information carriers with respect to the channel separation may have significant impact on the system output due to the nonlinear interaction described by Eq. (1).

As a second important consideration with regards to the Eq. (2), it is not only that the exact positions of the laser frequencies are not known precisely—it is that they are, in practice, randomly varying. With respect to the latter observation, it is self-evident that the introduction of the time-varying initial condition (2) in conjunction with the propagation equation (1), shall jointly lead to a stochastically varying output. Furthermore, owing to the fact that carrier frequency displacement is not a perturbation of an eigen-quantity, its consequence on the output variation can have a larger impact than intuitively expected. Consequently, even though the information-bearing waveform propagation obeys strictly deterministic laws, the uncertainty of the underlying carrier(s) (or the WDM channels) location and their phases lead to a stochastic variations of the output, rendering the nonlinear crosstalk appearing as a non-stationary stochastic effect, not amenable to successful equalization. This stochastic evolution, even in the case of strictly constant fiber properties results primarily from two effects: (i) mutual channel walk-off, and (ii) the induced variation of the input power profile. The perturbation of the walk off is a consequence of the frequency dependence of the index of refraction. As a qualitative example, note that a displacement of a carrier frequency by 160 MHz will cause an unaccounted for walk-off of the channel by half a symbol slot in a 25 GBaud system over 1000 km, and will lead to significant errors (and, thus, penalties) in the cancellation of the distributed nonlinear interactions. The effect of the power profile variation caused by the carrier frequency offset is often overlooked and requires illustrative examples.

FIG. 1A is a block diagram of a conventional link that incorporates independent information carriers. Such systems, which are widely used, are vulnerable to the issues that the inventive approach is designed to overcome. The basic system components include multiple transmitters 11 and a multiplexer 12 providing input into transmission link 15, which consists of one or more sections of optical fiber 13 and optical amplifier 14. The output of the transmission link 15 is fed into demultiplexer 16 and receivers 17. Each transmitter 11 independently emits a different frequency of light that serves as an information carrier signal. As a result of the carriers' independent generation, as well as the lack of correlated frequency stabilization among them, the information carriers wander in frequency independently of each other, thus hindering and/or preventing the effective mitigation of the nonlinear impairments.

Figure 1B:
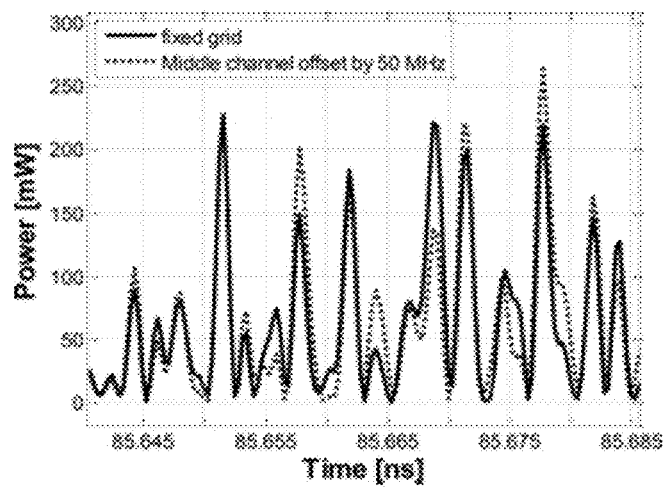
FIG. 1B is a plot showing the effect of a 50 MHz displacement of the central channel in a 15-channel-count WDM system on the overall power profile at the transmitting end.

FIG. 1B shows an excerpt of the power profile variation caused by changing the carrier frequency position by a mere 50 MHz of the middle channel only, among 15 channels—with the remaining 14 channels maintaining their fixed equidistant positions. As seen in FIG. 1B, even as small a deviation as 50 MHz of the carrier frequency of a single channel with respect to its assumed (i.e. ITU-grid) position, causes substantial differences in the overall field complex amplitude power profile. It should be noted that this variation of the input condition will cause a variation in the ensuing power-profile-driven nonlinear interaction in propagation (and ultimately at the output), to an extent commensurate with the level/accumulation of the nonlinear interaction. The exact quantification of this degradation will be examined in the next section. Notably, the effect of the frequency displacement (or variation) ought to be greater for systems with a higher impact of nonlinearity, thus those with higher signal powers, and/or at longer propagation distances.

In the absence of stochastic effects such as the polarization mode dispersion, the Kerr effect-imposed impairments are fully reversible using the absolute knowledge of the carrier frequencies and phases of the WDM channels. As a means of corroborating the above statement (i.e., confronted with the unattainable closed-form solution) we provide a reversal of the nonlinear propagation by back propagation—namely simulating the evolved nonlinear effects' outcome in a link with the inverse signed physical properties/constants (i.e., loss—if expressed in units of dB per unit length, dispersion terms and fiber nonlinearity). As far as the back-propagation ("BP"), it can be performed either on the received signal (i.e., taking the form of equalization), or at the transmitter by pre-distorting the information-bearing waveforms so as to attain the cancellation of the nonlinear effects at the receiver. While traditionally executed at the receiver end, BP through pre-distortion theoretically represents a better proposition: the transmitter-end implementation is devoid of amplified spontaneous emission (ASE) noise in the virtual (i.e., computational) part of the link. This property is recognized as beneficial with respect to the alternative receiver-end BP, since in the latter, the two-fold propagation of the noise-polluted signal (i.e. once in the physical link, followed by its simulated propagation in the nonlinear equalizer/solver) can lead to a deterioration in performance (e.g. by noise amplification, as in any non-unitary transfer function equalizer). Additionally, in order to achieve complete reversal of the nonlinear interactions, the optical field ought to be presented to the nonlinear solver/equalizer in entirety. This has never been performed in the receiver-end BP in practice, since only part of the field corresponding to the WDM channels is ever detected at the receiver end. Consequently, the four-photon mixing products that had leaked out of the transmitted band are omitted in traditional BP mitigation, thereby preventing a full realization of the impairment reversal.

The problems of the prior art system are addressed and overcome by utilizing the inventive approaches described herein. In an exemplary embodiment, a set of mutually frequency locked laser lines emanating from an optical frequency comb are employed at the transmit side as the carrier bank for a wavelength division multiplex system. A characteristic of the frequency comb on which the inventive approach at least partially relies is that the constituent carrier frequency lines wander in frequency and/or phase in a mutually correlated manner. Thus, deviations in frequency by one carrier in the system are closely followed by other carriers in the (frequency referenced) multi-carrier source. This is particularly true for neighboring oscillators.

Figure 2:
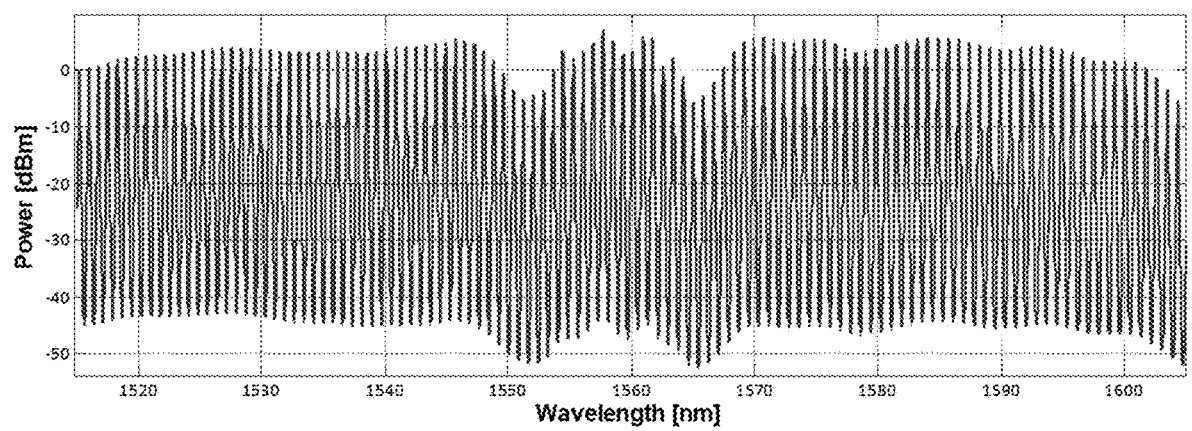
FIG. 2 shows a typical spectral output of a parametric comb with locked frequencies with a 100 GHz pitch.

FIG. 2 provides an example of the spectral output of a parametric comb source with a 100 GHz pitch covering conventional and long telecom transmission bands. This provides an example of a parametric comb source that can be effectively used as a mutually frequency referenced multi-wavelength source for effective nonlinearity mitigation in transmission systems according to an embodiment of the invention. The frequency locking for the frequency comb shown can be attained by the particular method of the comb construction.

Independent lasers may be stabilized and/or locked in frequency to a frequency reference at the emitting/transmitting side, receiver side, or a combination of both. A number of frequency locking methods may be used to achieve appropriate frequency-referencing, as will be apparent to one of skill in the art. To provide a few examples, the frequencies of the information carriers need not be stable in the absolute sense—if there is frequency drift, it is essential that the drift between the carriers be mutually dependent and/or at least correlated. In other approaches, frequency referencing of free running lasers to one or more master frequency references (e.g., a frequency comb) can be accomplished by one, or a combination, of the following techniques: injection locking, opto-electronic phase-locked loops (PLLs), frequency-locked loops (FLLs), or cavity-based wavelength lockers. In brief, injection locking refers to a method of using an optical signal as a reference and injecting it into the cavity of a laser oscillator, thus forcing it to oscillate at the desired reference frequency. The wavelength lockers rely on extraneous cavities as the reference, whereas the departure of the laser light frequency to the latter (i.e., the reference cavities) is used as a feedback signal to produce a correction signal, or an action (often by means of the laser injection current) in order to force the laser to emit at a desired frequency. The PLL and FLL approaches use a construct called an electronic phase-, or frequency-locked-loop in order to determine the departure of the laser emitting frequency to an optical frequency and to generate a corrective signal, or action fed back to the free-running laser, with the goal of forcing, or confining the laser emission to the desired frequency, or wavelength. Variations of these techniques, or alternative approaches to achieve the desired referencing will be apparent to one of skill in art.

After physical separation ("demultiplexing"), the carriers are passed to the corresponding transmitters, where the information-bearing waveforms (at the respective wavelength in a WDM system) are imprinted onto, i.e., superimposed to modulate, the respective carriers.

In one embodiment, upon reaching the end of the link, the channels are demultiplexed and passed to their corresponding standard receivers in which the process of carrier recovery, demodulation and impairments other than nonlinear propagation effects are mitigated by appropriate means. One possible technique is digital signal processing at the receiving end, although other approaches would be apparent to one of skill in the art. As noted above, in an exemplary embodiment, the full nonlinear mitigation is performed at the transmitting end of the link and the information signals received will have already been equalized for the nonlinear impairments.

As an illustrative example, FIG. 5, described in more detail below, shows such a calculation with two neighbors on either side taken into account in the nonlinearity mitigation process. Using the inventive calculation/estimation process, the imprinting of the waveforms onto their respective wavelength carriers is performed by arbitrary waveform generators. Furthermore, the process of generating the necessary waveforms by the arbitrary waveform generators should also address the compensation of the distortion of the waveforms arising from the electronic circuits, driver amplifiers, as well as optical modulators in a way as to yield waveforms as close as possible to those calculated in the pre-compensation process calculation.

Figure 3:
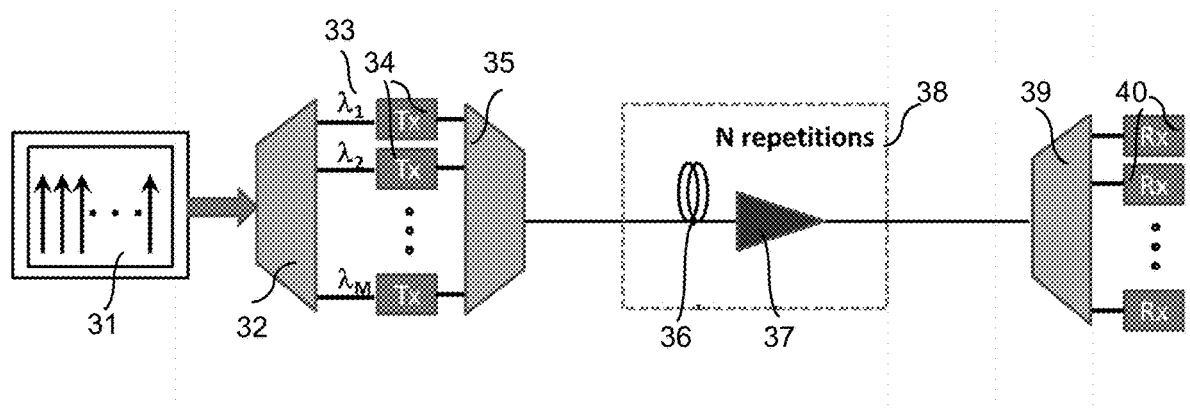
FIG. 3 is a block diagram of a transmission system employing frequency locked carriers.

FIG. 3 is a block diagram of a transmission system utilizing frequency mutually referenced carriers. The transmission system includes the components of a mutually frequency-referenced multicarrier source 31, which generates carrier signals at a plurality of different frequencies. The carriers from source 31 are first demultiplexed at demultiplexer 32, which outputs separate wavelengths 33 ($\lambda_1$, $\lambda_2$, ... $\lambda_M$) from the multiwavelength source 31 to the appropriate transmitter 34. Each transmitter of the plurality is configured to transmit a specific wavelength 33. The transmitters 34 imprint the information-bearing waveforms onto their respective carriers, which are then combined at multiplexer 35 for communication across transmission link 38. Transmission link 38 may include of one or more periods of optical fiber section/span 36 and optical amplifier 37, terminating at demultiplexer 39, which splits the multiplexed signal for distribution to receivers 40. Included within the receivers 40, is a processing block 42 (indicated by dashed lines) that receives and processes test signals for purposes of determining the appropriate compensation required to cancel (completely or partially) the system nonlinearities. The processing block 42 may be a digital signal processor and may include a back-propagation processing capability, equalization, and may include a look-up table with pre-determined compensation parameters to be selected based on the detected level of nonlinearity to shorten response within the communication system.

In some embodiments, the receivers 40 may include the ability to detect light in two orthogonal polarizations (often referred to as "polarization diversity"). Such receivers comprise a local oscillator that is used as the phase reference in the detection process of the received signal, a ninety-degree optical hybrid and two balanced optical receivers (with the complement of components for detection of each of the polarizations).

A key aspect of the inventive approach is that even in the presence of frequency wander, the locked frequencies emanating from the frequency locked source 31 wander in a correlated fashion, enabling an efficient mitigation of nonlinear impairments either by pre-distortion (i.e., the information bearing waveforms are jointly cast onto the carriers so as to cancel the nonlinear impairment), by back propagation at the receiving side, or a combination of operations (pre-distortion and back propagation) performed both at the transmitter and the receiving side.

Figure 4A:
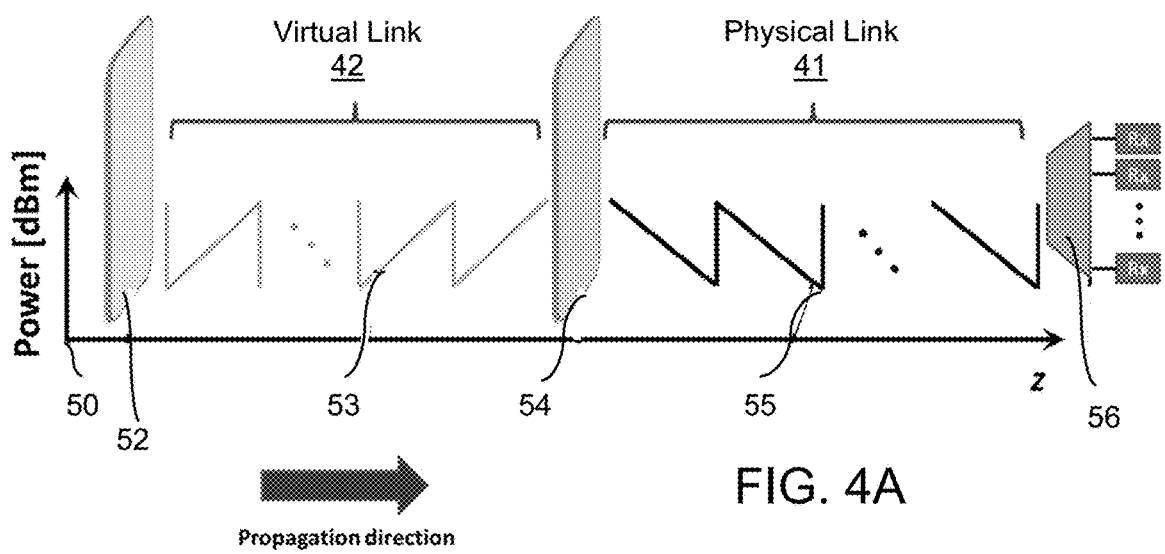
FIG. 4A is a diagrammatic view of power evolution in virtual and physical links with nonlinearity pre-distortion/pre-compensation.

In one embodiment, the process of imprinting information is performed in such a way that the information-bearing waveforms are pre-distorted so as to yield mitigation, or cancellation of nonlinear effects and/or impairments in the propagation through the transmission link. As an example, the relevant waveforms can be formed by calculating (with a varying level of precision) a propagation of a given block of information in a transmission link possessing all the relevant physical characteristics corresponding to the physical link, each with an opposite sign to that of the actual link for which the propagation is computed. Examples of such physical characteristics include, but are not limited to, chromatic dispersion parameter, the nonlinearity parameter and dispersion slope parameter, as well as the amplifier gain. The calculation of the link can be performed for the power evolution that is, in effect, a mirror image of that in the actual physical link. An example of this mirror image approach is shown in FIG. 4A. The link with opposite signed (i.e., negative) physical characteristics with a mirror image power evolution to that of the actual physical link, i.e., the link for which the computation is being performed, is referred to as a "virtual link". Referring to FIG. 4A, the virtual link 42 exhibits signal characteristics that are mirror images of those of physical link 41. As an example, Table 1 provides exemplary physical characteristics for a link consisting of ten spans of 100 km of optical fiber, where the center column of the table provides the values for the physical link.

TABLE 1

| Characteristic | Physical Link | Virtual Link (*) |
|---|---|---|
| chromatic dispersion D | 16 ps/nm-km | −16 ps/nm-km |
| dispersion slope S | 0.06 ps/nm$^2$-km | −0.06 ps/nm$^2$-km |
| nonlinear parameter γ, | 1.22 W$^{-1}$km$^{-1}$ | −1.22 W$^{-1}$km$^{-1}$ |
| loss α | 0.2 dB/km | −0.2 dB/km |
| Amplifier gain, each span | 20 dB | −20 dB |
| Launch power per span constant - per channel | 1 mW | 1 mW |

In order to determine the appropriate waveforms that should be imprinted onto the information carriers, the propagation calculation for a given block of information symbols that are to be transmitted can be performed for the virtual link using the parameters listed in the right-hand column of Table 1. In one embodiment, the information symbols transmitted in the channel may be divided into blocks, possibly overlapping, with the pre-distortion calculated for up to three neighbors on either side of the desired channel in the middle of running band in case of 50 GHz channel separation.

FIG. 4A illustrates an example of power evolution scheme (in a logarithmic scale) that may be used in implementing nonlinear impairment mitigation with pre-distortions. The evolution of the channels is computed based on a nonlinear Schrödinger solver (often simplified) in a virtual link having the mirror-image power evolution to that of a physical link with the relevant link parameters having an opposite sign to that of the physical link. Nonlinear Schrödinger solvers are commercially available for modeling of optical systems. One such software product is available from VPIphotonics, Inc., Norwood, Mass. Selection of an appropriate tool will be readily apparent to one of skill in the art. See also, G. P. Agrawal, *Nonlinear Fiber Optics* (Academic Publishers, 2007); A. Pejkic, et al., "All-optical switching in a highly efficient parametric fiber mixer: design study", *Optics Express*, Vol. 22, No. 19, 22 Sep. 2014; and E. Forestieri and M. Secondini, "Solving the Nonlinear Schrödinger Equation", in *Optical Communication Theory and Techniques*, E. Forestieri, Editor, Springer 2006. The resulting waveforms are imposed onto the WDM channels at their transmitters and are launched to propagate through a physical link, achieving the compensation of the nonlinear effects.

As shown in FIG. 4A, the components of the system are shown within power-propagation length coordinate system 51, with propagation running from left to right. Virtual link 42 includes the span between virtual transmitter 52 and the location of physical transmitter(s) 54, within which power evolution, indicated by waveform 53, occurs. The physical transmitters 54 imprint the information-bearing waveforms resulting from the virtual link propagation computation. Waveform 55 represents power evolution in the physical link 41. The physical receiving end 56 of physical link 41 includes a demultiplexer and receivers.

Figure 4B:
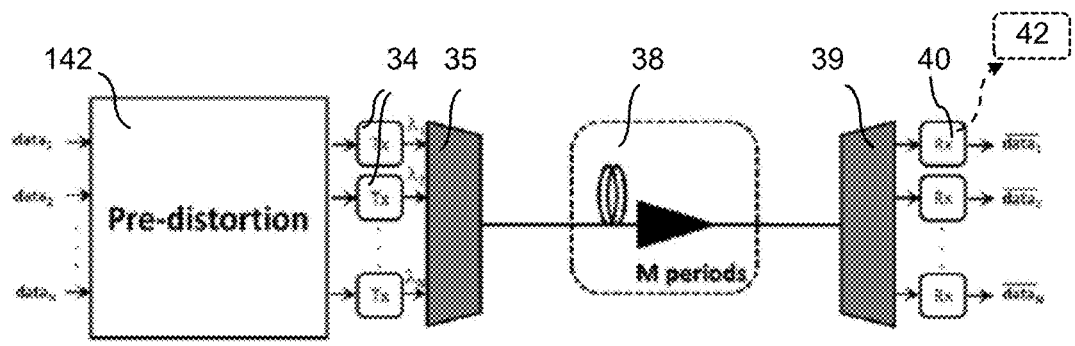
FIG. 4B is a block diagram of a transmission system for producing the power evolution of FIG. 4A.

For the considerations of noise corruption and field representation, simulations used with the exemplary embodiments were performed assuming pre-compensation, with a generalized block diagram shown in FIG. 4B. FIG. 4B provides a variation of the diagram of FIG. 3, incorporating the same basic components (indicated by the same reference numerals used for FIG. 3), but showing the pre-distortion profile calculator 142. Specifically, calculator 142 corresponds to the virtual link 42 in that the calculation of the parameters needed to produce the nonlinearity-cancelling pre-distortion is performed by the calculator 142 prior to transmission and multiplexing.

In essence, the pre-distortion block 142 acquires the information frames to be imprinted onto the WDM channels and pre-computes the joint BP pattern that is subsequently distributed and modulated onto optical carriers. From the perspective of simulations, it is well known that the accuracy of a symmetric split step simulation is proportional to the cube of the step size. Therefore, the ability to achieve complete reversal of the nonlinear interactions may require vanishingly small step-sizes, even in the absence of noise, since the accumulation of stochastic numerical errors prevents the full reversibility corresponding to the noise accumulation in propagation. The requirement for a high numerical accuracy was corroborated in an accurate split-step method—based long-haul propagation simulation of 15 WDM channels on a strictly fixed frequency grid. The simulation was implemented as a symmetric split step with a maximal allowed phase change per step of $5 \times 10^{-4}$ degrees in a developed graphic-processing-unit (GPU)-assisted solver. The results of the noiseless simulation are shown in FIG. 4C using the parameter values shown to the right side of the plot.

Figure 4C:
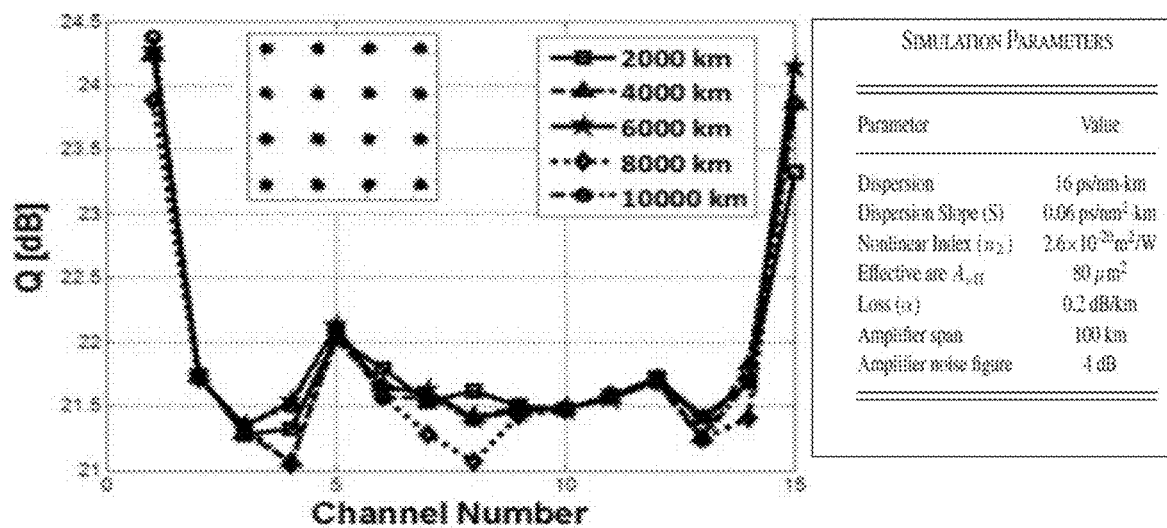
FIG. 4C is a plot showing the results of a simulation demonstrating full reversibility of 15-channel 25 GBaud 16 QAM propagation with a 2 dBm launch power per channel per span for distances up to 10,000 km with 100 km amplifier spans in a noiseless simulation of a fully frequency fixed grid.

As seen in FIG. 4C, the transmission (in the absence of noise) of up to 10000 km yielded no variation in performance, thus demonstrating a full reversal of nonlinear effects. Although the simulations were performed for QAM modulation format, the approach is of general applicability and can be employed with arbitrary signals, including orthogonal frequency division multiplex (OFDM), or even analog signals. While the computational complexity involved obtaining the results shown in FIG. 4C is relatively high, it nonetheless demonstrates the possibility of full cancellation of the deterministic (i.e., signal-signal) interactions in propagation. All results presented were quantified by the worst-case Q factor estimated as the minimal Euclidean distance between the nearest constellation points' separation, divided by the corresponding variance. The observed enhanced performance of the channels towards the edges in FIG. 4C is a consequence of the pulse shape used in the simulations. Specifically, each of the WDM channels in this simulation were shaped by a regular 4th-order Bessel filter, resulting in a finite spectral overlap between the neighboring channels (i.e. a finite linear crosstalk) and the observed 3 dB superior performance of the channels 1 and 15 is a consequence of those channels having only a single (linearly) interfering neighbor, rather than two interferers, pertinent to the rest of the 'inner' channels in the system. In contrast to the results shown in FIG. 4C, which correspond to the perfect knowledge of the channels' carrier frequencies, the penalty associated by the relative frequency offsets of the information carriers can be quantified for practical application in the existing systems.

Figure 5:
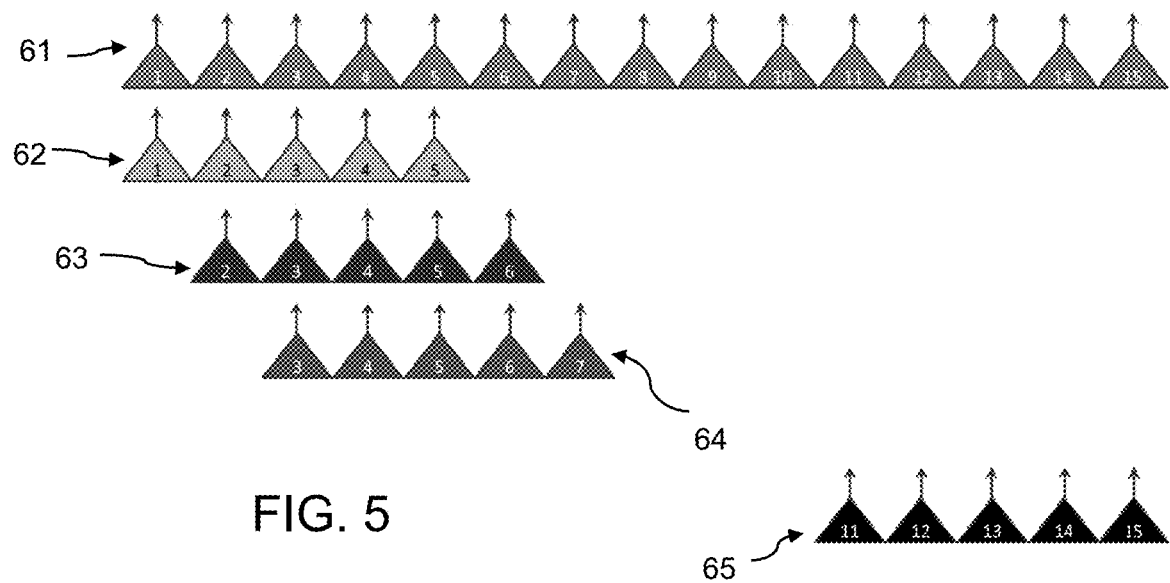
FIG. 5 diagrammatically illustrates an example of nonlinear mitigation with block-wise division of the frequency referenced channels.

FIG. 5 provides one example of nonlinear cancellation based on partially overlapping subsets of channels. Rather than using all channels in a system to transmit or receive information, one or more neighbor channels surrounding the channel of interest are used for nonlinearity cancellation. In other words, only a portion, i.e., not all, of the information carriers at the transmitting side, or a portion of the local oscillators at the receiving side, can be frequency-locked to achieve effective nonlinearity cancellation. In this approach, a full set of available carriers can be divided into mutually-locked subsets of locked carriers, which are either jointly referenced, or may not have correlated references. In another embodiment, the calculation of the waveform to be imprinted onto the carriers at the transmitter end can be based on a subset of transmitted channels in which the transmission system channels are divided into groups, with the calculation and, thus, the equalization, performed separately for each group.

In the illustrated example, two channels on each side of the channel of interest are shown, however, fewer (one) or more (three) may be used. According to this scheme, which uses a sliding window approach, a set of frequency locked carriers is divided into partially overlapping groups or subsets that can be used in nonlinearity mitigation. As illustrated, the upper line represents a 15-channel WDM system 61. The number corresponding to each channel #1-#15 is reflected within the triangles. The second line includes a subset 62 (or block) of channels (from within the 15 channels of system 61) used for nonlinearity mitigation for the channel of interest #3 in specified subset 62. In this sample subset, channels #1, #2, #4 and #5 are employed for nonlinearity cancellation. The third line represents another subset 63 of the total number of channels in system 61 that may be used for nonlinearity mitigation of channel of interest #4, with channels #2, #3, #5 and #6 performing the task of nonlinearity cancellation. The fourth line corresponds to a different subset 64 that may be used for nonlinearity mitigation of channel #5, with channels #3, #4, #6 and #7 providing mitigation of nonlinearity. The fifth line in the illustrated example shows a subset 65 in which channel #13 carries the information while channels #11, #12, #14 and #15 are configured to cancel nonlinearities. As mentioned above, this 2-1-2 arrangement of subsets if provided for illustration purposes. It will be apparent to those of skill in the art that subsets containing different numbers of channels may be used. Also, it is not necessary to mitigate the nonlinear effects on every channel—effective nonlinearity cancellation can be achieved using one or more subsets of the total number of available channels, e.g., as in the example of FIG. 5. It should also be noted that a similar approach can be used at the receiver side by employing frequency and/or phase referenced carriers serving as local oscillators and performing the compensation of nonlinear effects by means of back-propagation, or some other similar method on the received signals corresponding to the above-exemplified overlapping groups of channels.

Figure 6:
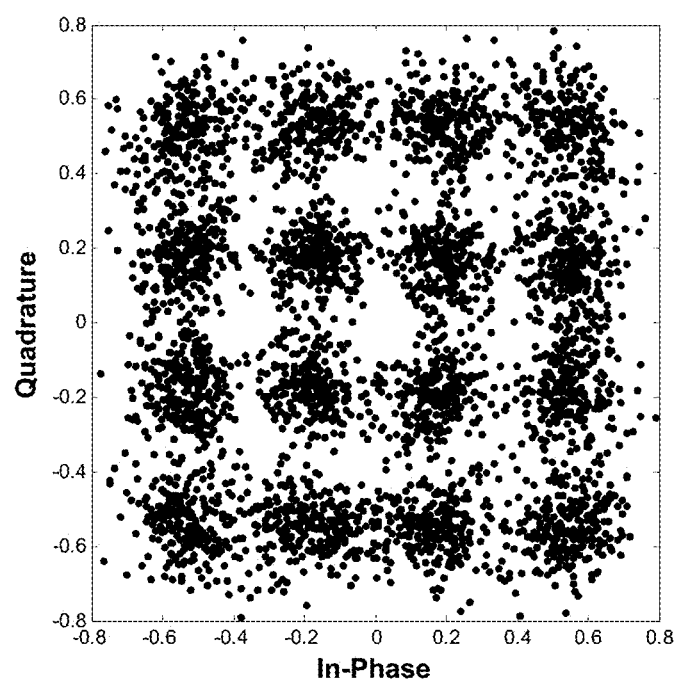
FIG. 6 is a constellation diagram of a received signal following 1200 km of propagation across a conventional transmission link without nonlinearity mitigation.

FIG. 6 is a constellation diagram of a received signal resulting from propagation over a conventional transmission link without nonlinear cancellation. The optimal launch power of −2 dBm per channel per span allows a reach of 1200 km for a 25 GBaud 16-QAM (Quadrature amplitude modulation) signal.

Figure 7:
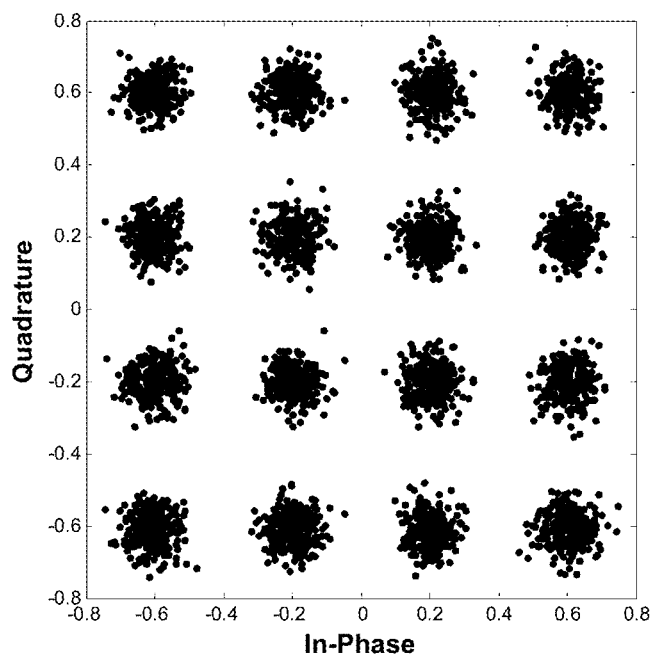
FIG. 7 plots the exemplary results of a link corresponding to that of FIG. 6 with the inclusion of nonlinearity cancellation based on frequency referenced carriers.

FIG. 7 provides an example of the improvement provided by the inventive method with nonlinear cancellation after 1200 km propagation in 100 km erbium-doped fiber amplified link spans with 15 channels with 3 dBm average launch power per channel, per span with the constellation diagram for a 25 GBaud 16 QAM shown for the middle channel only. This link had identical characteristics to those of the link used to produce the results shown in FIG. 6. Note that nonlinearity cancellation not only mitigates the nonlinear impairment, but also allows a higher average power per span, thus improving the signal-to-noise ratio and the performance at the end of the link.

Figure 8:
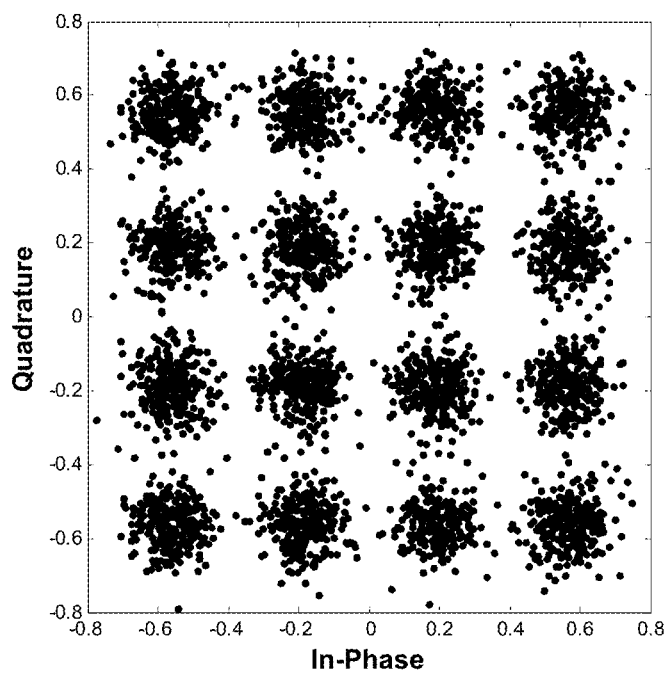
FIG. 8 plots the exemplary results of nonlinearity cancellation based on mutually phase and frequency referenced carriers allowing the reach of 3000 km.

FIG. 8 shows an example of nonlinear cancellation enabling a propagation of 3000 km for 25 GBaud 16-QAM signals in a 100 km erbium doped fiber amplified link span with 15 channels with 3 dBm average launch power per channel, per span with the constellation diagram for a 16-QAM shown for the middle channel only in a link with identical characteristics to those used to produce the results shown in FIG. 6. Note that nonlinearity cancellation not only mitigates the nonlinear impairment, but also allows a higher average power per span, thus producing a higher signal-to-noise level at the end of the link, leading to extended reach. With respect to the results shown in FIG. 6, this approach provides an approximate three-fold reach improvement.

FIG. 9A is the constellation diagram of a raw signal received after 1000 km propagation at 16 GBaud; 1 dBm per channel; erbium-doped amplified (EDFA) link only 50 km spans (optimal launch power −7 dBm). FIG. 9B shows the resulting constellation diagram for the same link span employing nonlinearity cancellation according to the invention.

FIG. 10 is a set of constellation diagrams of received signals for four cases at 2 dBm per channel power for 16 Gbaud rate for uncompensated nonlinear impairment (upper left); nonlinearity cancellation with independent carriers (upper right); nonlinearity cancellation with two mutually coherent carriers and one independent carrier (lower left); nonlinearity cancellation with three, i.e., all, mutually coherent carriers (lower right).

Figure 11A:
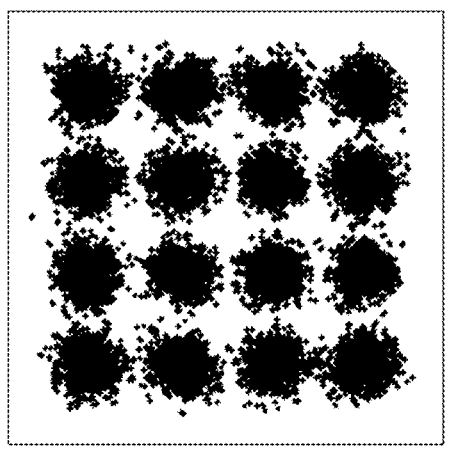
FIGS. 11A and 11B are constellation diagrams showing reach with and without nonlinearity cancellation, respectively.
Figure 11B:
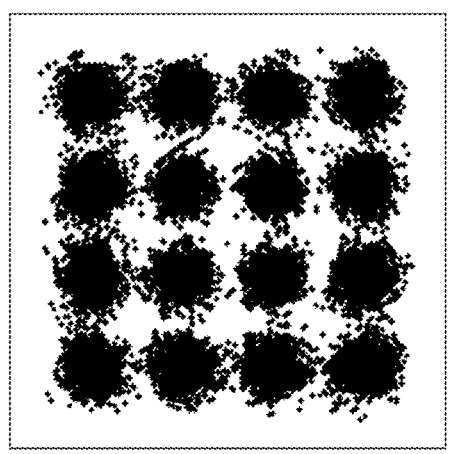

FIG. 11A shows the raw system output following 2000 km propagation at 16 GBaud with no nonlinearity cancellation. FIG. 11B shows the output after 4000 km propagation under that same conditions with nonlinearity cancellation according to the invention.

The frequency-referencing process of the present invention may in some embodiments be performed intermittently, i.e., non-continuously, with referencing being updated/renewed in either regular or irregular time intervals. This is true whether the referencing is applied to the carriers at the emitting end or to local oscillators at the receiving end.

In some embodiments of the invention, time coinciding frames of data across all the channels in the WDM system to be transmitted are simulated as propagating through a link matching the actual transmission in terms of all major link parameters, including dispersion loss, amplification, polarization mode dispersion, and the nonlinear properties, trading off the complexity and accuracy of the desired effectiveness of the method, based on the principle that a smaller simulation step will yield better compensation, and vice versa. In particular, the simulation is performed to mimic a signal propagating backwards through the link, in terms of the power profile, i.e., the power evolution. The main assumption is that it is desirable for the information to be received free of any nonlinear crosstalk impairment and that a pristine condition is propagated backward through the system. In the simplest realization, the back propagation can be computed in a single step, accounting for the chromatic dispersion effects only. The outcome of the simulation, representing the complete electrical field (stemming from all the aggregate channels in the system and in the particular interval of time) is, next, phase conjugated—the sign of its imaginary component is reversed, while the real part is retained intact. Furthermore, in polarization-multiplexed systems, the phase conjugate of the information is taken separately in each of the polarization states. Considering that the time domain phase conjugation is equivalent to spectral inversion, a key feature of the inventive method is that the spectral order of channels, i.e., from the first to last, consequently needs to be reversed, so that the last channel in its frequency order is modulated onto the first carrier in the systems. The computed phase conjugated field is next imprinted onto the WDM channels in the system, so that the total field after modulating the discrete carriers (oscillators) matches the pre-computed total field, according to the particular symbol combinations across all of the WDM channels in the particular frame. The proper subsequent evolution of the generated field will yield not only mitigation of the nonlinear effects, but will also compensate for a significant portion of the dispersion effects, thus significantly reducing the complexity and dissipation of the digital signal processing units at the receiving end. As pointed out above, the proper field advancement is attained only for the truly phase-locked carriers. Otherwise, the nonlinear effect evolution in the fiber will not be appropriately mitigated. In particular, frequency combs, or oscillators locked through some other means can be used in this respect as the oscillator engine for the approach. Finally, in order for lengthy computations associated with computing the pre-compensating field, look-up tables could be employed to circumvent the requirement for real-time calculations.

In an application of the inventive method, frequency referenced carriers may be used for mitigation of nonlinear impairment in optical orthogonal frequency division multiplexed (OFDM) signals. In such an application, nonlinear impairment mitigation is implemented for multiple constituent channels, or signals. The inventive method may also be used for generation and/or transmission of the multi-carrier information channels, sometimes referred to as super-channels. Mitigation of the nonlinear impairment can achieved within a single super channel, irrespective of other surrounding channels, which may, or may not be realized as super-channels, or multiple super-channels simultaneously.

The following example details the application of the inventive approach to simulated conditions of carrier frequency wander and its impact on nonlinearity mitigation.

Example 1: Carrier Frequency Wander

The implemented simulation engine consisted of two parts, the pre-distortion calculator (i.e., the virtual link), and a physical link simulator. In the first engine, the randomly seeded PRBS data (with different initial condition per channel) were first mapped to 16QAM symbols with Gray mapping, and subsequently imprinted onto the corresponding carriers (i.e., laser oscillators) by means of band limited Mach-Zehnder (MZI) modulators, including pre-distortion of the waveforms ensuring the optimized constellation generation. The propagation was simulated in a NLS solver (with a symmetric power evolution to that of the physical link and with the opposite sign physical constants to that of the physical link). The output electric field of the pre-distortion engine was first wavelength demultiplexed, and then homodyne received. The resulting analog I and Q electrical components for each channel were conveyed to a set of transmitters (of the physical link) in each of which the electrical signals are pre-distorted in order to achieve the 1-to-1 mapping of the received fields (in the virtual link) and those that would be propagated in the physical link. The pre-distorted I and Q components are imprinted to the physical link carriers having a 10 kHz linewidth by means of $4^{th}$ order Bessel function 25 GHz MZI's. Upon propagation through the physical link part (modeled by the standard NLS solver), the channels are de-multiplexed, coherently detected (in a bank of band-limited coherent receivers) by randomly seeded 10 kHz local oscillators, and after the standard train of DSP procedures (carrier phase recovery, timing recovery—note that the dispersion is already compensated for by means of pre-distortion), the constellations were extracted for performance estimation.

FIGS. 12A-12D show the Q factor estimated over $2^{12}$ symbols in a 15-count 50 GHz-spaced WDM system carrying 25-GBaud 16QAM data shaped by raised cosine filters with a 10% roll-off factor. The channels were set to propagate at various powers per channel at launch (i.e. 0 dBm, 3 dBm and 6 dBm) over a distance of 1000 km, consisting of 10 spans of standard single mode fibers with inline erbium-doped fiber amplifiers characterized by a noise figure of 4 dB fully compensating the fiber loss in each span. In order to determine the efficacy of the nonlinear effect compensation, all the simulations henceforth have been performed with an allowed phase change of 0.01 degrees per nonlinear step. For a reference, in Table 2 below shown are the results of an uncompensated system, system with 'per-channel BP', as well as the joint multi-channel BP in the case of frequency-referenced carriers. The last column in Table 2 is demonstrative of a significant performance improvement provided by the joint multichannel BP.

TABLE 2

| Power [dBm] | No compensation Q [dB] | Per Channel BP Q [dB] | Multi-channel BP Q [dB] |
|---|---|---|---|
| 0 | 4.9 | 8.2 | 11 |
| 3 | n/a | 4.2 | 13 |
| 6 | n/a | n/a | 14 |

Figure 12A:
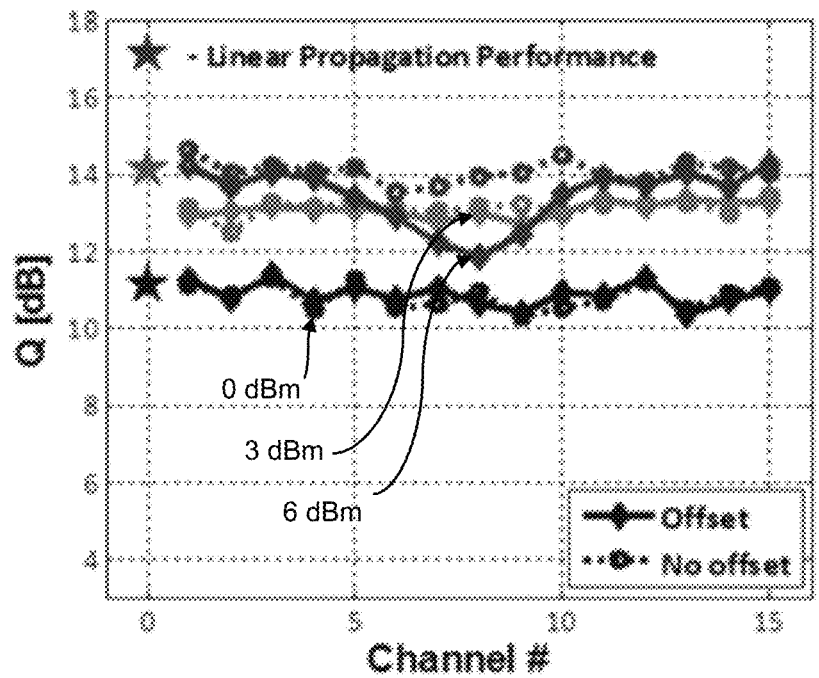
FIGS. 12A-12D illustrate the effect of the middle channel (only) frequency displacement in a 15-count WDM system with 100 km amplifier spans (with fixed 4 dB noise figure amplifiers) at the 1000 km propagation distance.
Figure 12B:
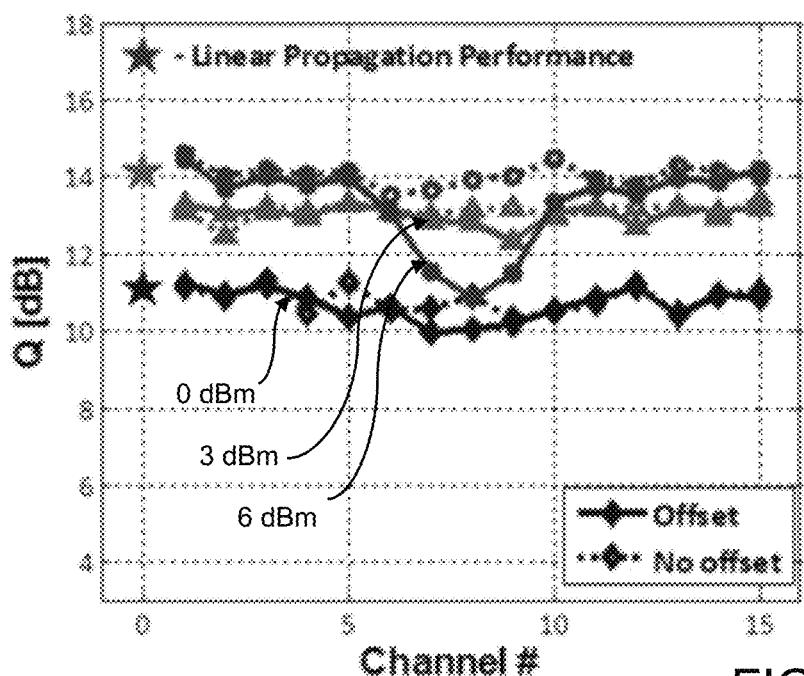
Figure 12C:
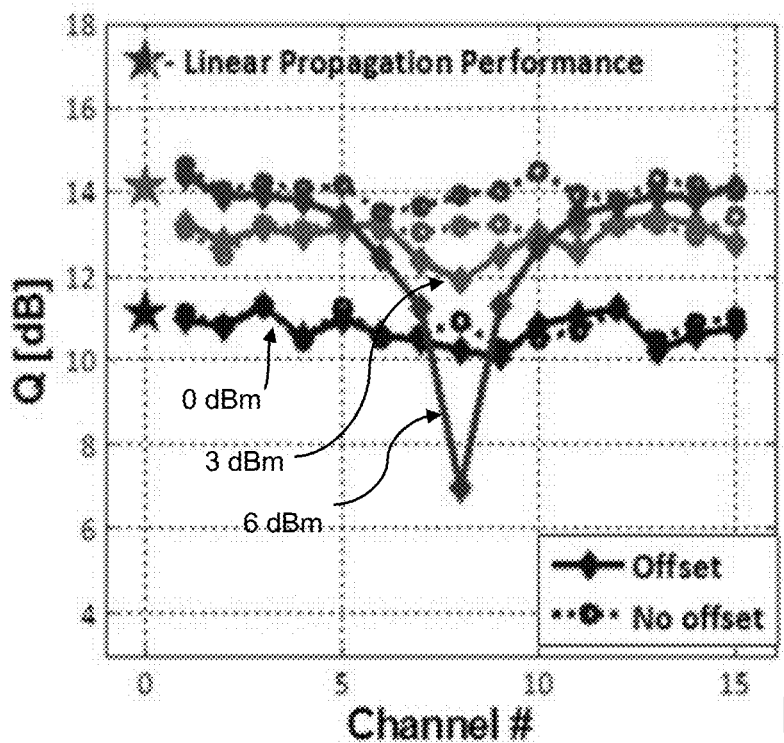
Figure 12D:
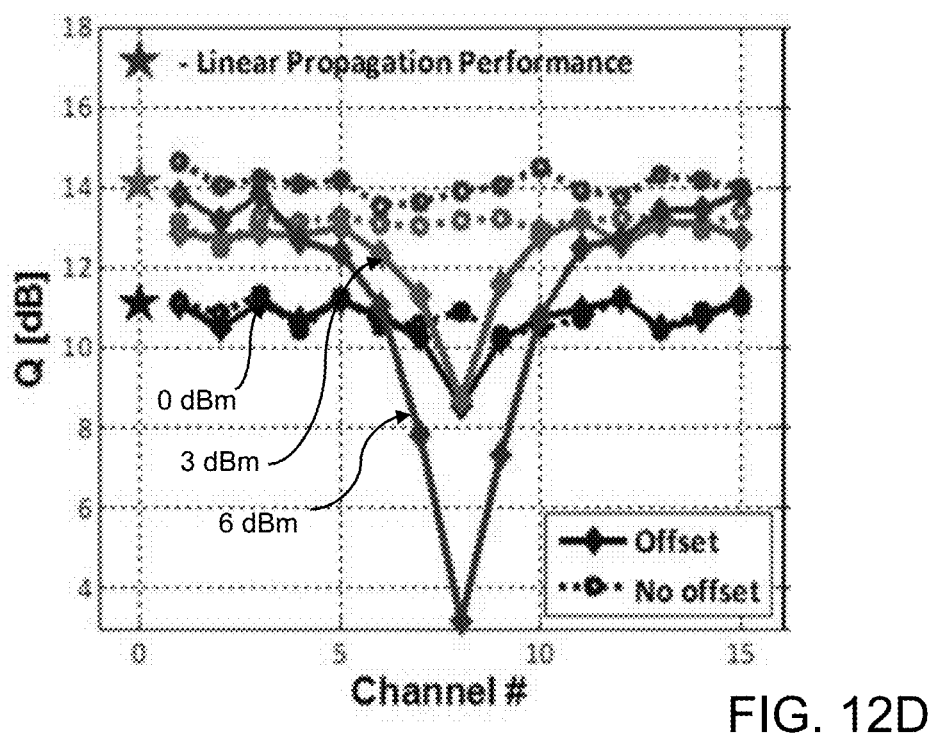

For the sake of maintaining tractability of the system behavior, only the carrier frequency of the central channel was displaced by a shift ranging from 50 MHz to 500 MHz (i.e. from 0.1% to 1% of the standard ITU standard grid separation). Meanwhile, the pre-distortion calculation was performed for a perfectly equidistant grid, as is done in standard practice. As implied by the results shown in FIGS. 12A-12D, a displacement of as little as 50 MHz yields a prominent penalty for high average powers (i.e. 6 dBm)—a 2-dB Q-degradation is observed and is clearly related to the diminished ability of reversing the nonlinear effects. With a further offset increase, a 100 MHz frequency displacement induces an additional 1-dB penalty for 6 dBm launch power, while having virtually no effect on the two lower launch powers per channel considered. Yet a further increase in the carrier frequency deviation incurs observable penalties even for low launch powers. In particular, while the 200 MHz offset incurs a significant 7 dB penalty (for the central channel) at a high 6 dBm power, even a moderate power level (3 dBm) exhibits an obvious departure from the ideal performance. More prominently, the carrier frequency excursion by 500 MHz (i.e. 1% of the ITU channel spacing) causes a complete dissipation of information and irreversible penalties for the high (6 dBm) power levels. Meanwhile, 4.5 and 2 dB penalties are incurred for the launch powers of 3 and 0 dBm per span for the latter frequency displacement, respectively. The results shown in FIG. 12A-12D bear another important characteristic. The nonlinear impairment in fiber optic transmission bears a notion of mixing (as a consequence of the $\lambda^{(3)}$ nature of the silica response). Qualitatively speaking, the propagating WDM channels walk off through one another (at a rate defined by their frequency separation and the group velocity dispersion of the fiber), which induce a mutual phase modulation and mix their pertinent information content. The nonlinear equalization by means of the underlying interaction reversal attempts to inverse this power flow. However, the displacement of the (central) channel(s) from its assumed location perturbs the launch waveform and its subsequent evolution due to the associated deviation of the channel's walk-off rate, thus resulting in an incomplete reversal of the mixing products to their original source(s) (i.e. channel(s)). FIGS. 12A-12C, this information transfer for moderate power levels and frequency displacements is contained to the nearest neighbors. Indeed, not only does the physically displaced channel suffer from a performance degradation, but the perturbation of the field evolution causes incomplete nonlinear crosstalk reversal. The latter leaves a part of the distortion residual in the neighbors and, in turn, affects their performance.

With a further displacement increase, the described trend is only exacerbated, ultimately leading to a complete loss of information in the central (i.e. displaced) channel. As implied by the results in FIG. 12D, the described catastrophic path significantly affects the nearest neighbors and proliferates to the further surrounding channels. Overall, the observed catastrophic loss of information in the central channel (see FIG. 12D)) affects the performance of as many as six surrounding channels (i.e. three on each side of the central channel). From a different perspective, the results shown in FIGS. 12A-12D attest to the locality of the nonlinear interaction. In effect, for the SMF physical properties (most notably its dispersion), the nonlinear interaction is contained to seven nearest neighbors, with a major part of the interaction being contained to a total of five nearest neighbors.

In FIGS. 12A-12D, also shown is the performance of the ideal linear propagation (i.e. in the absence of nonlinear effects), denoted by stars at the $0^{th}$ channel abscissa. As can be seen, unlike the noiseless propagation shown in FIG. 4C where full reversal of nonlinear interactions is achieved, results in FIGS. 12A-12D clearly exhibit a residual penalty in the presence of noise, which grows with the average launch power per span. The observed residual penalty is a consequence of the nonlinear phase noise which represents the ultimate bound on the achievable performance, as well as the capacity. Furthermore, due to the walk-off proportionality to the product of the frequency displacement and the propagation length, penalties comparable to those shown in FIGS. 12A-12D shall be incurred for even smaller frequency offsets, at longer propagation distances, inversely proportional to the frequency offset.

On the other hand, in the absence of nonlinearity (i.e., strictly linear systems, similarly to the radio communications, or a low power operated fiber optic transmission link), the carrier and phase wander correspond to the perturbations of the underlying harmonic eigenfunctions that, at the output, are manifested as simple time shifts, or rotations of the electro-magnetic field. The system dynamics of this kind resembles plain unitary transformations, thus lending themselves to simple (lumped) corrections that are trivially realized through digital signal processing in practice. In sharp contrast, longitudinally distributed and power-dependent nature of Kerr interaction implies that the absence of the absolute frequency reference will yield intractable (irreversible) mixing products at the transmission system receiving end. FIGS. 12A-12D also point to the fundamental inability of the BP to tackle multichannel nonlinear cross talk in transmission systems without an accurate knowledge of the absolute position and the relative separation of the channels' carrier frequencies, let alone their stochastic wander. It is also important to emphasize that in practice, currently employed lasers can easily wander by as much as several GHz from their nominal position, with average near-term stability of 300 MHz, making the findings of this study all the more relevant to the practical systems.

In contrast to the scenario considered in the preceding set of simulations, we consider propagation based on frequency-referenced carriers. These carriers can, for instance, be realized by frequency combs serving as a bank of information carriers. While frequency combs are not free from frequency fluctuations in general, due to the fact that these coherent multi-wavelength emitters are driven by a single master oscillator, all of the constituent lines in the comb cascade experience highly correlated, joint frequency offsets. The latter form of joint channel displacement in no way alters the launch power profile (consider Eq. (2) and FIG. 1B), thus leaving the displacement-caused walk-off perturbation the only remnant cause of incomplete restoration of the nonlinear interaction. In fact, the joint displacement of the channels maintains the walk-off rate, to the extent allowable by the magnitude of the second-order ((32) and higher-order dispersion terms.

Figure 13A:
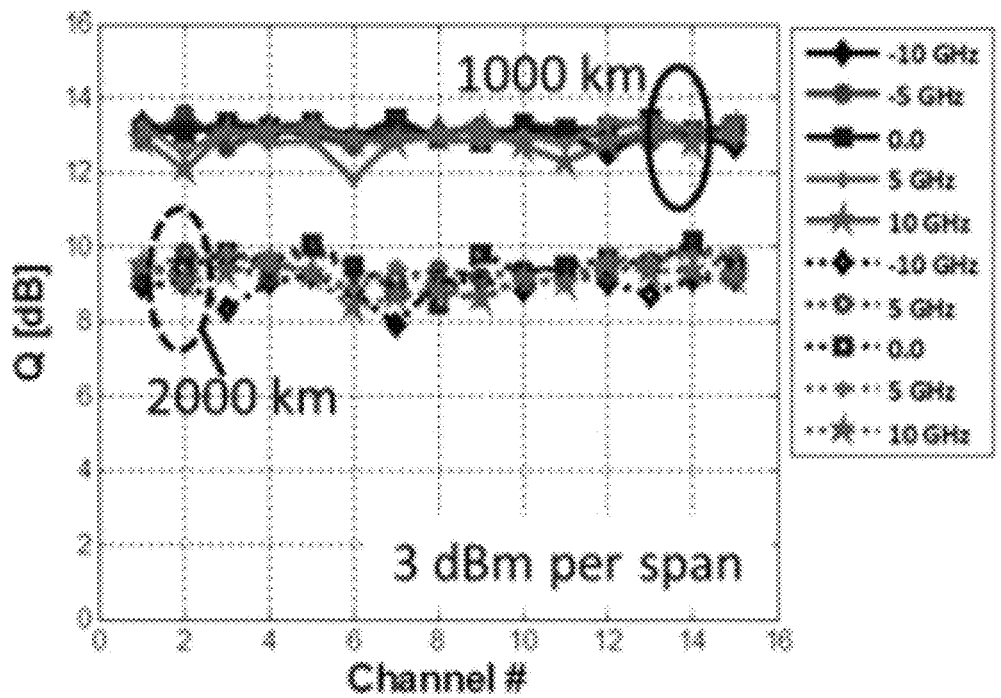
FIGS. 13A and 13B illustrate the effect of a synchronous frequency offset for 3 dBm average launch power per span, and 6 dBm average power per span, respectively.
Figure 13B:
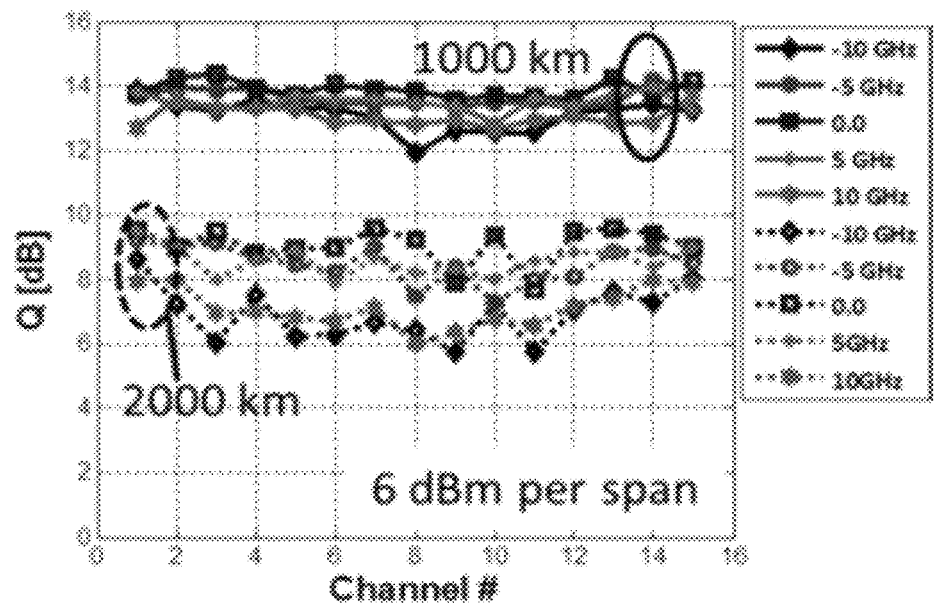

The results of the effect of this joint frequency wander are shown in FIGS. 13A-13B. Performance with nonlinearity cancellation for fully frequency-referenced systems with a given identical frequency offset from the assumed frequency positions in back propagation with solid lines showing performance at 1000 km and dotted lines at 2000 km for 3 dBm average launch power per span (FIG. 13A), and 6 dBm (FIG. 13B) average power per span. Unlike the scenario pursued in generating the result in FIGS. 12A-12D, where only the central channel position was shifted, in this set of simulations all channels were displaced by an equal frequency shift varying from −10 to 10 GHz with respective to their nominal ITU positions. Comparing the results in FIG. 13 to those from FIGS. 12A-12D, the allowed carrier frequency uncertainty is increased by more than an order of magnitude for a fiber with a finite dispersion (and dispersion slope)—a carrier frequency deviation by as much as 5 GHz (i.e., 10% of the ITU grid) at the distance of 2000 km still allows a complete reversibility of the nonlinear impairment with practically vanishingly small penalty, as compared to the fully linear case of propagation. We do note that the power levels considered in the simulations may appear too high from the perspective of the existing systems. However, the elevation of the launch power is absolutely necessary for increasing both the reach and the capacity (in the information-theoretic sense) in the transmission systems. The joint channel BP approach, as implemented in this work, clearly enables both of those objectives. Thus, from a perspective of utilizing frequency-referenced sources in transmission, the benefits from employing frequency combs are two-fold: First, they provide the all-important referenced frequency grid for transmission systems, which the presented results have established as the pivotal factor for the successful nonlinearity mitigation. Second, in the case of the frequency wander—to which even the combs are susceptible, these frequency-referenced carriers ensure a synchronous joint displacement of the carriers, thus significantly mollifying the effect of carrier frequencies separation variation (i.e., breathing). Note that comb sources other than parametrically generated can be used for the purpose of frequency referenced carriers (i.e., mode-locked lasers, modulator combs), however due to the associated inherent short-comings, none of the alternative sources is capable of providing both a wide spectral coverage (corresponding to at least the whole C-band), high OSNR/high power per line, as equalized a spectral response over the emission spectrum, as well as the flexible ITU-compliant frequency pitch, as those demonstrated by the parametric combs. Lastly, it must be equally emphasized that the comb sources' master oscillators are more than an order of magnitude more stable than the common commercial wavelength sources. Consequently, comb sources provide better than 20 MHz-stable frequency grid, which further reinforces the employment of these emitters as the optimal solution for information carriers in high capacity transmission systems capable of reaching otherwise unattainable information capacities in transmission.

It should be noted that the results confirm the theoretical ability of full reversal of signal-signal nonlinear interactions in a deterministic and stationary transmission fiber optic transmission system. Based on the findings, one can conclude that the reach and capacities in transmission are determined only by the loss, noise accumulation and the associated nonlinear phase noise development. Additionally, the ultimate propagation limits are set by the stochastic polarization mode dispersion and the polarization dependent loss in transmission, the effect of which will be presented elsewhere.

While the present invention has been described above in terms of specific embodiments, it is to be understood that the invention is not limited to these disclosed embodiments. Upon reading the teachings of this disclosure many modifications and other embodiments of the invention will come to mind of those skilled in the art to which this invention pertains, and which are intended to be and are covered by both this disclosure and the appended claims. It is intended that the scope of the invention should be determined by proper interpretation and construction of the appended claims and their legal equivalents, as understood by those of skill in the art relying upon the disclosure in this specification and the attached drawings.

The invention claimed is:
1. An optical fiber transmission system, the system comprising:
   a transmitting end comprising:
      at least one carrier source configured for generating a plurality of carrier signals, each carrier signal associated with one of a plurality of frequencies and configured for carrying a plurality of channels, wherein subsets of the carrier signals are mutually frequency-referenced so that frequency drift among the carrier signals within the subsets is correlated and mutually dependent, and wherein phases of the subsets of carrier signals are free-running and not locked;
      a first demultiplexer configured for receiving the plurality of carrier signals and separating the carrier signals into a plurality of wavelengths;
      a plurality of transmitters, each transmitter configured for imprinting information-bearing waveforms onto the plurality of channels associated with a corresponding carrier wavelength;
      a multiplexer configured for receiving the imprinted carrier signals and outputting a multiplexed signal; and
      a pre-distortion processor configured for applying a non-linearity correction to the at least one carrier source;
   one or more transmission link for transmitting the multiplexed signal, the transmission link comprising an optical fiber and an amplifier; and
   a receiving end comprising:
      a second demultiplexer configured for receiving the transmitted signal and separating the transmitted signal into the plurality of wavelengths;
      a plurality of receivers configured for coherently detecting the separated signals, each receiver comprising a frequency-locked local oscillator configured for generating a detector output corresponding to one of the plurality of wavelengths; and
      a processor configured for receiving the receiver outputs and extracting information therefrom, the processor further configured for detecting nonlinearity within the one or more transmission links using at least a first subset of the carrier signals and generating a virtual link configured for substantially cancelling the nonlinearity in one or more second subset of the carrier signals via pre-distortion prior to transmission;
      wherein the virtual link exhibits characteristics that are characterized by opposite signed physical constants and negative gain relative to the one or more transmission link.

2. The system of claim 1, wherein the at least one carrier source comprises a plurality of frequency locked free running lasers that are frequency locked using one or more of injection locking, current injection, laser cavity control, opto-electronic phase-locked loops, frequency-locked loops and cavity-based wavelength lockers, a frequency comb, or a plurality of stabilized independent lasers referenced to a frequency reference.

3. The system of claim 1, wherein the at least first subset of the carrier signals comprises one or more groups of neighboring carriers, wherein the carriers within each group are mutually frequency locked.

4. The system of claim 1, wherein the processor comprises a back-propagation block.

5. The system of claim 1, wherein each subset of carrier signals comprises neighboring carrier signals and wherein different subsets of neighboring carrier signals are partially overlapping.

6. The system of claim 5, wherein each subset of neighboring carrier signals comprises a carrier signal of interest disposed between two or more carrier signals used for nonlinearity mitigation.

7. The system of claim 1, wherein the processor is configured to calculate compensation separately for each subset of carrier signals.

8. A method for mitigating nonlinearity in a wavelength division multiplex (WDM) system comprising multiple carriers, at least of portion of the multiple carriers configured for transmitting information-bearing waveforms, the method comprising:
   pre-compensating the information-bearing waveforms based upon a pre-distortion pattern obtained by computing an evolved nonlinear effects' outcome at an output of a virtual link possessing all the relevant physical characteristics and gain corresponding to an actual transmission link, each with an opposite sign to that of the actual transmission link for which the propagation is computed, wherein one or more subsets of carriers are mutually frequency-referenced so that frequency drift among the carriers within the subsets are correlated and mutually dependent, and wherein phases of the subsets of carriers are free-running and not locked; and
   using frequency-referenced local oscillators at receiving side of the actual transmission link,
   wherein the evolved nonlinear effects' outcome is computed according to a nonlinear Schrödinger equation,
wherein an input condition to the nonlinear Schrödinger equation for MWDM channels is represented as $$A_{tot}(z=0;t) = e^{-i\omega_c t} \cdot \sum_{m=1}^{M} e^{-i[(\omega_m + \delta\omega_m(t))t + \delta\phi_m(t)]} \cdot \sum_{k} A_{mk} p(t-kT),$$

where A represents a field complex amplitude, $\omega_c$ denotes a central frequency of an optical field, $\omega_m$ is an expected value of carrier frequency offset of a channel m relative to the central frequency, p(t) is a generating pulse shape of information waveforms, and $\delta\omega_m$ and $\delta\phi_m$ represent stochastic variations of the information carriers' (angular) frequency and phase.

9. The method of claim 8, wherein the one or more subsets of carriers are generated by a carrier source comprising a plurality of free running lasers that are frequency locked by one or more of injection locking, current injection, laser cavity control, opto-electronic phase-locked loops, frequency-locked loops and cavity-based wavelength lockers, a plurality of independent lasers that are frequency locked to a frequency reference, or a frequency comb.

10. The method of claim 8, wherein the one or more subsets of carriers comprises at least a first subset of the carriers comprising one or more groups of neighboring carriers, wherein the carriers within each group are mutually frequency locked.

11. The method of claim 8, wherein the one or more subset of carriers comprises a plurality of subsets of neighboring carriers and wherein different subsets of neighboring carriers are partially overlapping.

12. The method of claim 11, wherein each subset of neighboring carriers comprises a carrier of interest disposed between two or more carriers used for nonlinearity mitigation.

13. The method of claim 8, wherein pre-compensating comprises compensating separately for each subset of carriers.

14. A method for mitigating nonlinearity in a wavelength division multiplex (WDM) system comprising multiple carriers, the method comprising:

applying mutual frequency referencing across at least a portion of the multiple carriers to mutually frequency lock the carriers by one or more of frequency locking free running lasers to a frequency reference, generating the multiple carriers using a frequency comb, and generating the multiple carriers using stabilized independent lasers referenced to a frequency reference, wherein frequency placement of the carriers is known, frequency drift among the carriers is correlated and mutually dependent, and wherein phases of the carriers are free running and not locked in a transmitting end of a transmission link;

using a subset of the frequency-referenced carriers, the subset comprising two or more neighbor carriers and at least one information-bearing carrier, determining nonlinearity within the transmission link according to a nonlinear Schrödinger equation, wherein an input condition to the nonlinear Schrödinger equation for MWDM channels is represented as $$A_{tot}(z=0;t) = e^{-i\omega_c t} \cdot \sum_{m=1}^{M} e^{-i[(\omega_m + \delta\omega_m(t))t + \delta\phi_m(t)]} \cdot \sum_k A_{mk} p(t-kT),$$

where A represents a field complex amplitude, $\omega_c$ denotes a central frequency of an optical field, $\omega_m$ is an expected value of carrier frequency offset of a channel m relative to the central frequency, p(t) is a generating pulse shape of information waveforms, and $\delta\omega_m$ and $\delta\phi_m$ represent stochastic variations of the information carriers' (angular) frequency and phase;

using frequency-referenced local oscillators at receiving side of the transmission link; and compensating for the determined nonlinearity, wherein compensating comprises canceling the nonlinearity in the at least one information-bearing carrier by back propagation in a virtual link characterized by opposite signed physical constants and negative gain relative to the transmission link, wherein the back propagation is performed either at a transmitter by pre-distorting the at least one information-bearing carrier, or at the receiving side where received signals are equalized.

15. The method of claim 14, wherein applying mutual frequency referencing comprises applying frequency locking, and wherein frequency locking is selected from injection locking, current injection, laser cavity control, opto-electronic phase-locked loops, frequency-locked loops and cavity-based wavelength lockers.

16. The method of claim 14, wherein applying mutual frequency referencing to at least a portion of the multiple carriers comprises defining subsets of neighboring carriers within the multiple carriers, wherein the carriers within each subset are mutually frequency locked.

17. The method of claim 16, wherein the subsets are at least partially overlapping.

* * * * *